US009781378B2

(12) United States Patent
Howe

(10) Patent No.: US 9,781,378 B2
(45) Date of Patent: Oct. 3, 2017

(54) COORDINATING IMAGE SENSING WITH MOTION

(71) Applicant: The Boeing Company, Chicago, IL (US)

(72) Inventor: Wayne R. Howe, Irvine, CA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 14/481,647

(22) Filed: Sep. 9, 2014

(65) Prior Publication Data

US 2016/0073048 A1   Mar. 10, 2016

(51) Int. Cl.
H04N 5/77 (2006.01)
H04N 9/804 (2006.01)

(52) U.S. Cl.
CPC .............. *H04N 5/77* (2013.01); *H04N 9/8042* (2013.01)

(58) Field of Classification Search
CPC ......... H04N 5/77; H04N 5/232; H04N 9/8042
See application file for complete search history.

(56) References Cited

U.S. PATENT DOCUMENTS

| 4,908,705 | A |   | 3/1990 | Wight |
|---|---|---|---|---|
| 5,481,479 | A | * | 1/1996 | Wight ...................... H04N 3/30 348/144 |
| 5,668,593 | A |   | 9/1997 | Lareau et al. |
| 6,366,734 | B1 |   | 4/2002 | Beran et al. |
| 7,042,392 | B2 |   | 5/2006 | Whelan et al. |
| 7,372,400 | B2 |   | 5/2008 | Cohen et al. |
| 7,489,926 | B2 |   | 2/2009 | Whelan et al. |
| 7,554,481 | B2 |   | 6/2009 | Cohen et al. |

(Continued)

FOREIGN PATENT DOCUMENTS

| CN | 103796011 A | 5/2014 |
|---|---|---|
| EP | 2495702 A1 | 9/2012 |

(Continued)

OTHER PUBLICATIONS

United Kingdom Intellectual Property Office, Combined Search and Examination Report under Sections 17 and 18(3) in U.K. Patent Application No. GB1515524.5, mailed Jan. 26, 2016, 8 pages.

(Continued)

*Primary Examiner* — Jamie Atala
*Assistant Examiner* — Hesham Abouzahra
(74) *Attorney, Agent, or Firm* — Kolisch Hartwell, P.C.

(57) ABSTRACT

A method may include generating one or more control signals configured to control a velocity of an image sensing system based on a rate of recording pixels frames in the image sensing system. In some embodiments, the method may alternatively or additionally include generating one or more control signals configured to control the rate of recording in the image sensing system based on the velocity of the image sensing system. In some embodiments, a portion of image pixel data for a pixel frame may be output for transmission to a remote receiver. In some embodiments, the output data may include a recently recorded image data pixel for those surface resolution cells for which there is no currently stored reference image data pixel of a previously recorded pixel frame that is the same or is different by less than a threshold amount as the recently recorded image data pixel.

18 Claims, 5 Drawing Sheets

(56) References Cited

U.S. PATENT DOCUMENTS

| | | |
|---|---|---|
| 7,579,986 B2 | 8/2009 | DiEsposti |
| 7,579,987 B2 | 8/2009 | Cohen et al. |
| 7,583,225 B2 | 9/2009 | Cohen et al. |
| 7,619,559 B2 | 11/2009 | DiEsposti |
| 7,688,261 B2 | 3/2010 | DiEsposti |
| 7,859,455 B2 | 12/2010 | Gutt et al. |
| 7,904,243 B2 | 3/2011 | Cohen et al. |
| 7,952,518 B2 | 5/2011 | Whelan et al. |
| 7,969,352 B2 | 6/2011 | DiLellio et al. |
| 8,019,541 B2 | 9/2011 | Cohen et al. |
| 8,035,558 B2 | 10/2011 | Cohen et al. |
| 8,296,051 B2 | 10/2012 | Cohen et al. |
| 8,542,147 B2 | 9/2013 | Whelan et al. |
| 8,570,216 B2 | 10/2013 | Gutt et al. |
| 2001/0015755 A1* | 8/2001 | Mathews .............. G01C 11/02 348/144 |
| 2004/0155959 A1 | 8/2004 | Cullens |
| 2012/0114229 A1 | 5/2012 | Zhou |
| 2013/0142500 A1* | 6/2013 | Yavin .................. G01C 11/025 396/7 |
| 2013/0203437 A1 | 8/2013 | Whelan et al. |
| 2014/0104445 A1* | 4/2014 | Ramachandran ...... G01C 25/00 348/208.2 |
| 2016/0060824 A1* | 3/2016 | Akashi .................. E01C 23/01 348/148 |

FOREIGN PATENT DOCUMENTS

| | | |
|---|---|---|
| GB | 2483224 A | 3/2012 |
| KR | 1020080006925 A | 1/2008 |
| WO | 9820301 A1 | 5/1998 |
| WO | 2012020413 A1 | 2/2012 |

OTHER PUBLICATIONS

Bass, Michael et al. Handbook of Optics: vol. 2, Devices, Measurements, and Properties, Second Edition, McGraw-Hill, 1995, pp. i-xxvii and 19.1-19.57. Please note particularly pp. 19.1 to 19.19.
Government of Canada, Natural Resources Canada: Multispectral Scanning, Date Modified: Oct. 30, 2013, retrieved from the Internet on Jul. 14, 2014 from http://www.nrcan.gc.ca/earth-sciences/geomatics/satellite-imagery-air-photos/satellite-imagery-products/educational-resources/9337, 3 pages.

* cited by examiner

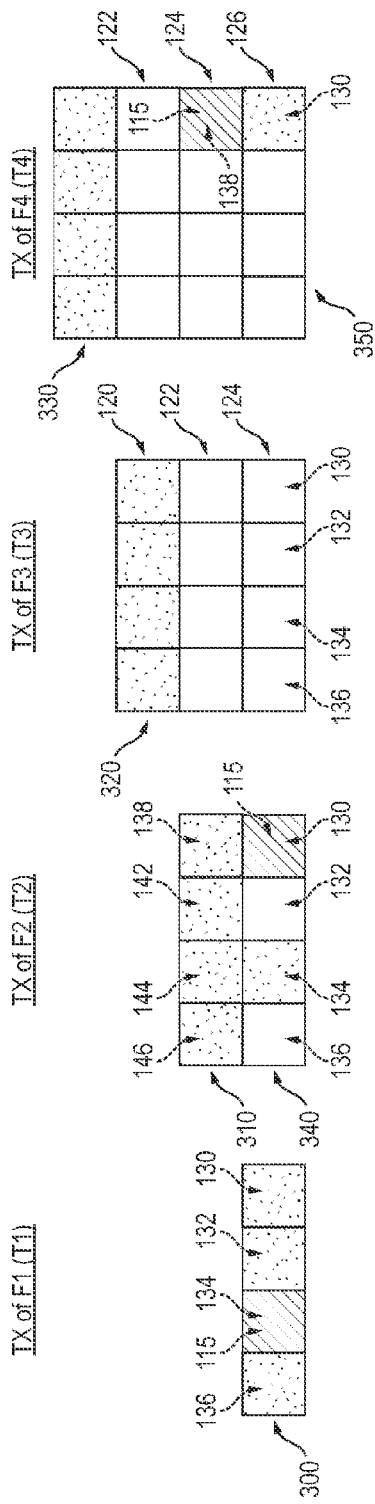
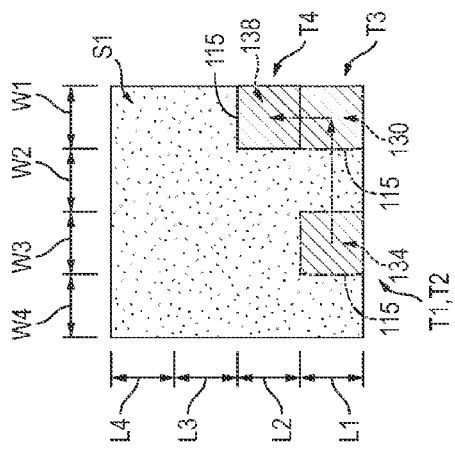
FIG. 3
FIG. 4

COORDINATING IMAGE SENSING WITH MOTION

CROSS-REFERENCES

The following related applications and materials are incorporated herein, in their entireties, for all purposes: U.S. Pat. Nos. 7,042,392; 7,372,400; 7,489,926; 7,554,481; 7,579,986; 7,579,987; 7,583,225; 7,619,559; 7,688,261; 7,859,455; 7,904,243; 7,952,518; 7,969,352; 8,019,541; 8,035,558; 8,296,051; 8,542,147; 8,570,216; and U.S. Patent Application Publication No. 2013/0203437.

FIELD

This disclosure relates to data compression. More specifically, the disclosed embodiments relate to systems and methods for coordinating image sensor motion with image sensor characteristics to reduce transmission of redundant data from a continuously moving image sensor or subject.

BACKGROUND

Typically, when performing an ISR (intelligence, surveillance, and reconnaissance) flyover, an image sensing system, such as a camera or video camera, mounted to an ISR vehicle records video and/or moving sensor images of the ground. Because flyover platforms generally have communication links with limited bandwidth capabilities to remote stations, the recorded video or other image data is typically compressed using a pre-existing compression method such as MPEG, and then transmitted to a ground station. However, most of these pre-existing compression methods were originally designed for commercial motion pictures, in which the recorded video is generally dominated by local motion and has a relatively low level of global motion (if any at all). Thus, when used to compress a flyover data recording, these pre-existing compression methods may generally require significant encoding time before transmission, as well as significant decoding time at the ground station, which in some cases can be quite undesirable. In addition, the compressed data may still have redundancies resulting in data transmission rates that can be compressed even further. Accordingly, there exists a need for improved compression systems and methods.

SUMMARY

In one example, a method may comprise a step of generating one or more control signals configured to control a velocity of an image sensing system based on a rate of recording pixel frames in the image sensing system. In some embodiments, the method may further comprise a step of generating one or more control signals configured to control the rate of recording pixel frames in the image sensing system based on the velocity of the image sensing system. In some embodiments, the method may further comprise a step of generating one or more control signals configured to control a distance of the image sensing system from a surface being imaged by the image sensing system.

In another example, a method may comprise a step of generating one or more control signals configured to control a rate of recording pixel frames in an image sensing system based on a velocity of the image sensing system. In some embodiments, the image sensing system may be moving in a direction of travel relative to a surface being imaged that is spaced from the image sensing system. The image sensing system may include one or more sensor elements for recording a pixel frame including at least M adjacent rows each having at least one image data pixel, with each image data pixel corresponding to a surface resolution cell of the surface determined by an instantaneous field of view of the surface by the associated sensor element. The M rows may be disposed along the direction of travel, where M is an integer greater than one, and each surface resolution cell has an along-track dimension in the direction of travel. In some embodiments, generating one or more control signals may be configured such that each recording interval of time associated with recording of the pixel frames may be within a threshold amount of time equal to m multiplied by a time it takes for the image sensing system to move the along-track dimension relative to the surface, where m is an integer less than M. In some embodiments, the method may further comprise a step of outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m.

In another example, a method may comprise a step of storing a plurality of pixel frames taken from one or more sets of pixel frames received from an image sensing system moving in a direction of travel relative to a surface being imaged, wherein the surface is spaced from the image sensing system. The image sensing system may have one or more sensor elements for producing the one or more sets of pixel frames. Each pixel frame may include at least M adjacent rows each having at least one image data pixel. Each image data pixel may correspond to a surface resolution cell of the surface determined by an instantaneous field of view of the surface by the associated sensor element. The M rows may be disposed along the direction of travel. M may be an integer greater than one. Each surface resolution cell may have an along-track dimension in the direction of travel. Each set of pixel frames may include pixel frames recorded at each of a plurality of sequential recording intervals of time. Each recording interval of time may be within a threshold amount of time equal to m multiplied by a time it takes for the image sensing system to move the along-track dimension relative to the surface, where m is an integer less than M. In some embodiments, the method may further comprise a step of outputting to a transmitter for transmission to a receiver that is remote from the image sensing system, a recently recorded image data pixel for those surface resolution cells for which there is no currently stored reference image data pixel of a previously recorded pixel frame that is the same or is different by less than a threshold amount as the recently recorded image data pixel.

In another example, a controller may comprise a control component configured to be operatively coupled to an image sensing system. The image sensing system may be supported by a platform disposed in spaced relationship from and moving in a direction of travel relative to a surface. The image sensing system may have one or more sensor elements for producing one or more sets of pixel frames. Each pixel frame may include at least M adjacent rows each having at least one image data pixel. Each image data pixel may correspond to a surface resolution cell of the surface determined by an instantaneous field of view of the surface by the associated sensor element. The M rows may be disposed along the direction of travel. M may be an integer greater than one. Each surface resolution cell may have an along-track dimension in the direction of travel. The control component may be configured to generate one or more control signals for controlling one or more of (a) a velocity of the image sensing system relative to the surface, (b) a distance of the image sensing system from the surface, and (c) a rate of recording the pixel frames, such that each recording interval of time associated with recording of the pixel frames is within a threshold amount of time equal to m multiplied by a time it takes for the image sensing system to move the along-track dimension relative to the surface, where m is an integer less than M. The output component may be coupled to the control component. In some embodiments, the controller may further comprise an output component. The output component may be coupled to the control component. The output component may be configured to output to a transmitter for transmission as base image data from the controller to a receiver that is remote from the controller, an image data pixel for each surface resolution cell from at least one pixel frame and less than a number of pixel frames that is equal to the highest integer less than M/m.

The present disclosure provides various systems and methods, which may be used to control imaging systems in flyover situations, which may result in improved data compression and transmission. The features, functions, and advantages, as described herein, may be achieved independently in various embodiments of the present disclosure, or may be combined in yet other embodiments, further details of which can be seen with reference to the following description and drawings.

BRIEF DESCRIPTION OF THE DRAWINGS

FIG. 3 is a schematic diagram depicting base image data and change image data corresponding to the sensed image data pixels of FIG. 2 for transmission to the ground station of FIG. 1.

FIG. 4 is a schematic diagram depicting an overlay of base and change image data, which may be performed at the ground station of FIG. 1 for the transmissions illustrated in FIG. 3.

DESCRIPTION

Overview

Figure 1:
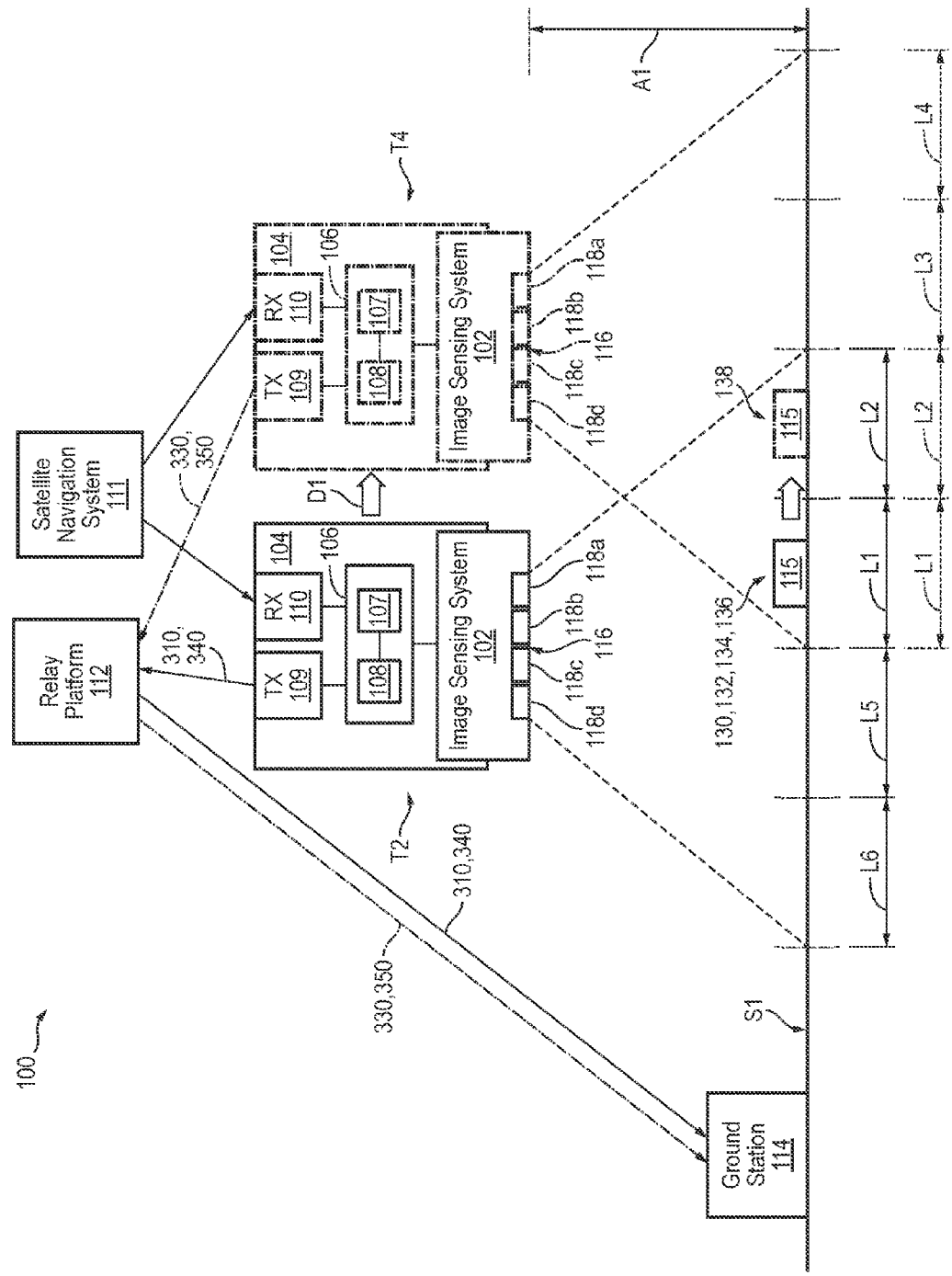
FIG. 1 is a general block diagram of an example of a system including a platform, a satellite navigation system, a relay platform, a ground station, and an image sensing system supported by the platform for imaging a surface.

Various embodiments of systems and methods are described below and illustrated in the associated drawings. Unless otherwise specified, a system or method and/or their various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other systems and methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Because of the increase in high definition reconnaissance data, the amount of data from aerial reconnaissance vehicles has increased significantly. Current video data compression methods use algorithms to compress data on the order of 100-200:1 and require significant processing overhead. Rather than attempting to compress all of the acquired data, embodiments of the present disclosure may reduce the amount of data transmitted by not transmitting redundant data or by transmitting limited amounts of redundant data. For example, embodiments may use high precision locating and timing systems, such as one or more of those described in the incorporated references (or one or more portions thereof), to determine the location, orientation, altitude, and speed of an aerial reconnaissance vehicle. Using the location and timing information, embodiments may tie multiple geographical image frames together. Then, using a filter, such as an XOR filter, embodiments may transmit only those pixels (e.g., recorded sensed image data pixels of a frame from associated one or more sensor elements) that have not already been transmitted. Because most geographic video data does not change (e.g., roads, ground surfaces, and other features may stay in the same geographical locations across multiple frames of the acquired video), transmitting only the data that does change can lead to significant savings.

Similarly, various embodiments may enable accurate determinations regarding image sensing system position (e.g., to within one decimeter), timing (e.g., to within less than one nanosecond), velocity (e.g., a speed in a direction), acceleration, a scan-line rate of the image sensing system, a frame rate of the image sensing system, and distance to the surface or object(s) being imaged, such as the terrain and/or a target. These accurate determinations may enable extremely accurate prediction of pixel motion (e.g., motion of a surface resolution cell in the recorded video or other image sensor from one frame of the video to another frame of the video). Such an embodiment may eliminate intense processing overhead to compute and encode/decode pixel motion, and also may substantially reduce compression overhead caused by imprecise prediction of future pixel motion. For example, such an embodiment may achieve compressions of up to 10,000:1 depending upon the amount of local motion versus global motion in the acquired video. Also, very little encoding/decoding overhead processing may be required since a single global movement of the pixels may be determined from the locating and/or timing systems rather than being computed from complex pixel motion algorithms. Thus, lower power processing and real-time encoding/decoding may be enabled by various disclosed embodiments, which will be described further below in more detail.

Further, aspects of the present disclosure may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the present disclosure may take the form of a computer program product embodied in a computer-readable medium (or media) having computer readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present invention may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present disclosure are described below with reference to flowchart illustrations and/or block diagrams of methods, apparatuses, systems, and/or computer program products according to aspects of the present disclosure. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following examples describe selected aspects of exemplary systems and methods. These examples are intended for illustration and should not be interpreted as limiting the entire scope of the present disclosure. Each example may include one or more distinct embodiments, and/or contextual or related information, function, and/or structure.

Example 1

This example describes an illustrative system 100 including an image sensing system 102, a platform 104, a controller 106 including a control component 107 and an output component 108, a transmitter 109, a navigation and/or positioning receiver 110, a satellite navigation system 111, a relay platform 112 (e.g., a communications satellite), and a ground station (or remote receiver) 114; see FIGS. 1-4.

System 100 may be configured to sense and record image data of a surface S1, such as a surface of the earth, features thereof, such as geographic information, mountains, deserts, cities, roads, buildings, and bodies of water, and objects (or targets) thereon, such as object 115. Further, system 100 may be configured to transmit recorded image data to a remote receiver, such as ground station 114, if that recorded image data corresponds to "new" data (e.g., corresponds to a geographical location not yet imaged by system 100, or is indicative of a change or movement in a particular geographical location that has previously been imaged). Moreover, system 100 may be further configured to not transmit at least a subset of the recorded image data, for example, if that subset corresponds to a particular geographical location that has already been imaged and is indicative of no change.

More specifically, image sensing system 102 may be configured to be supported by platform 104. Platform 104 and image sensing system 102 may be disposed in a spaced relationship from surface S1. Further, platform 104 and image sensing system 102 may move in a direction of travel D1 relative to surface S1, as is shown. Platform 104 may be or include any suitable vehicle, mechanism, structure, device, apparatus, or system for providing the spaced relationship and/or the movement of image sensing system 102 relative to surface S1. For example, platform 104 may be a satellite, a drone, or any other suitable aerial or "overhead" aircraft. In some embodiments, platform 104 may include a gimbal system for directing image sensing system 102 toward surface S1. In some examples, an image sensing system may be supported in a fixed position, and a surface that is being imaged may move relative to the image sensing system.

Image sensing system 102 may have one or more sensor elements 116. Sensor elements 116 may comprise one or more digital sensor elements and/or one or more analog sensor elements. If sensor elements 116 include one or more analog sensor elements, then analog information from such analog sensor elements may be subsequently converted to digital information.

Sensor elements 116 may be configured to produce at least M adjacent rows of N adjacent sensed image data pixels. Each sensed image data pixel may correspond to a surface resolution cell of surface S1 determined by an instantaneous field of view of surface S1 by the associated sensor element. The sensed image data pixels in each row may be disposed in a line transverse to direction of travel D1. The M rows may be disposed along direction of travel D1, where M and N may be positive integers, and M may be greater than one (1). For example, sensor elements 116 may be (or include) p rows of n adjacent sensor elements that produce a frame (or pixel frame) of the M rows of N sensed image data pixels, where p may be a positive integer less than or equal to M, and n may be a positive integer less than or equal to N. The n sensor elements in each row may be disposed in (or substantially along) a line transverse to direction of travel D1. The p rows may be disposed along (or substantially along a line parallel to) direction of travel D1. For example, in an embodiment where p=1 and n=1, sensor elements 116 may include one (1) sensor element, and image sensing system 102 may include any suitable mechanism, device, apparatus, structure, and/or programming configured for scanning the field of view of the one sensor element along an along-track direction (e.g., in a direction parallel to direction of travel D1), along an across-track direction (e.g., in a direction normal to the view of FIG. 1), and/or along any other suitable direction for producing the M rows of N sensed image data pixels. For example, system 102 may include a rotating mirror configured to rotate about first and second orthogonal axes, or other suitable optical, electrical, magnetic, piezoelectric, and/or mechanical movement system.

Further, in some embodiments, one or more of p and n may be less than respective integers M and N, in which case image sensing system 102 may include any suitable mechanism, device, apparatus, structure, and/or programming configured for scanning the field of view of an (p<M)×(n<N) array of sensor elements along the along-track direction, along the across-track direction, and/or along any other suitable direction for producing the M rows of N sensed image data pixels.

In some embodiments, p=1 and n=N, in which case image sensing system 102 may include any suitable mechanism, device, apparatus, structure, and/or programming configured for scanning the field of view of 1×N array of sensor elements along the across-track direction for producing the M rows of N sensed image data pixels. For example, system 102 may include a rotating mirror or other system that rotates about an axis substantially parallel to the along-track direction.

In some embodiments, p=M and n=1, in which case image sensing system 102 may include any suitable mechanism, device, apparatus, structure, and/or programming configured for scanning the field of view of M×1 array of sensor elements along the along-track direction for producing the M rows of N sensed image data pixels. For example, system 102 may include a rotating mirror or other system that rotates about an axis substantially parallel to the across-track direction.

Figure 2:
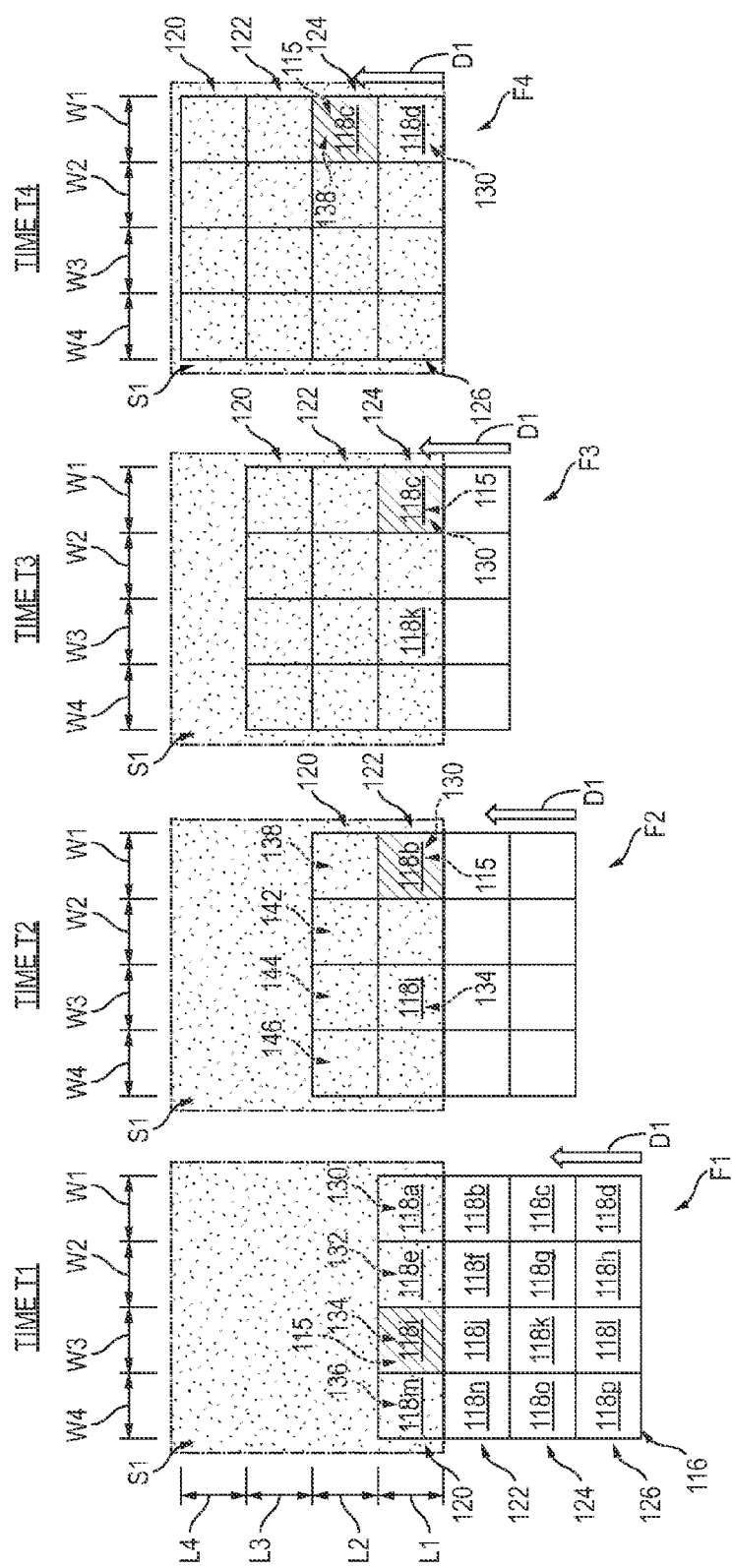
FIG. 2 is a schematic diagram illustrating an example of a portion of the surface and sensed image data pixels produced by the image sensing system of FIG. 1 at a plurality of recording intervals of time.

Further, in some embodiments p=M and n=N, such as in the example depicted in FIGS. 1 and 2 to simplify illustration. In such an embodiment, the M rows of N sensed image data pixels may be associated with separate sensor elements of the M×N array of sensor elements in each frame. However, it should be understood that in embodiments where one or more of p and n may be less than respective integers M and N, one or more of the sensor elements may be associated with more than one sensed data pixel in the produced frame. For example, if p=1 and n=1, then the M rows of N sensed image data pixel may be associated with the same sensor element. Thus, while the description that follows relates the M rows of N sensed image data pixels to corresponding positions of an M×N array of sensor elements, it should be understood that in other embodiments, the M rows of N sensed image data pixels may be similarly positioned but not necessarily corresponding to separately positioned or separately associated sensor elements.

Further, in some examples, the plurality of sensor elements may be greater than M×N and sensor elements may be selected for recording that correspond to an M×N array of sensed image data pixels.

Also, each of the lines in which the respective rows of sensed image data pixels are disposed may preferably be rectilinear (or straight) and/or may be orthogonal to direction of travel D1. However, in some embodiments, these lines may be curved (e.g., arced) and/or may not be orthogonal to direction of travel D1.

With reference now to the example shown in FIGS. 1 and 2, the sensor elements in each row may be disposed in a line transverse to direction of travel D1, and the M rows may be disposed along direction of travel D1, as described above. In particular, to simplify illustration, FIG. 2 depicts sensor elements 116 as including a four by four (4×4) matrix of sensor elements 118*a-p*, with M and N both equal to four (4). Adjacent elements 118*a*, 118*e*, 118*i*, 118*m* may be disposed in a first row 120 of the M adjacent rows. Elements 118*b*, 118*f*, 118*j*, 118*n* may be disposed in a second row 122 of the M adjacent rows. Elements 118*c*, 118*g*, 118*k*, 118*o* may be disposed in a third row 124 of the M adjacent rows. Elements 118*d*, 118*h*, 118*l*, 118*p* may be disposed in a fourth row 126 of the M adjacent rows. However, in some embodiments, M and/or N may be larger, such as on the order of 1000, or even greater, depending on the resolution of the image sensing system. In other embodiments, either of M and/or N may be less than four (4). For example, M may be on the order of 1000, and N may be one (1), or N may be on the order of 1000, and M may be one (1).

Sensor elements 116 of image sensing system 102 may be of any suitable type for producing a sensed image data pixel or pixels of a surface resolution cell. For example, the sensor elements of image sensing system 102 may correspond to (and/or include, but not be limited to) the sensor elements of a camera, a video camera, an infrared imaging system, a laser radar (LIDAR) imaging system, a multispectral imaging system, a hyper-spectral imaging system, a synthetic aperture radar (SAR) system, a wide area motion imaging (WAMI) system, a charge-coupled device (CCD) system, or a suitable combination of the foregoing. For example, in some embodiments, the image sensing system may include a multispectral imaging system, as mentioned above, which may be configured to produce a plurality of sensed image pixels of a surface resolution cell. Each pixel of the plurality of sensed image pixels may correspond to a different spectral wavelength of electromagnetic radiation emitted from the surface resolution cell. In some embodiments, the image sensing system (or an associated apparatus) may be configured to compile the plurality of sensed image pixels to produce a single image pixel of the surface resolution cell.

In general, each sensor element may be configured to produce a sensed image data pixel or pixels of a surface resolution cell, which may be determined by an instantaneous field of view of surface S1 by the associated sensor element, for example, as described above, with each sensor element operating simultaneously in parallel. Alternatively, a single sensor element may be used for each scan line and/or multi-spectral scan line with a rotating mirror or other moving scanning device, as also described above. Further, each surface resolution cell may have an along-track dimension in direction of travel D1, and may have an across-track dimension perpendicular to direction of travel D1.

For example, during a first recording interval of time T1, as depicted in FIG. 2 (e.g., which may correspond to an interval of time when sensor elements 116 are to the left of the position shown in solid lines in FIG. 1), sensor element 118*a* may produce a sensed image data pixel of a surface resolution cell 130. Cell 130 may have an along-track dimension L1 and an across-track dimension W1. Similarly, during time T1, the other sensor elements of row 120 may produce sensed image data pixels for corresponding surface resolution cells having along-track dimension L1 (or another similar or varying along-track dimension depending on a configuration of the system). For example, during time T1, sensor element 118*e* may produce a sensed image data pixel of a surface resolution cell 132 having along-track dimension L1 and an across-track dimension W2. Sensor element 118*i* may produce a sensed image data pixel of a surface resolution cell 134 having along-track dimension L1 and an across-track dimension W3. Sensor element 118*m* may produce a sensed image data pixel of a surface resolution cell 136 having along-track dimension L1 and an across-track dimension W4. As shown, the sensed image data pixel corresponding to sensor element 118*i* during time T1 may indicated that object 115 is located in surface resolution cell 134 (e.g., corresponding to a first geographical location).

During a second recording interval of time T2, as depicted in FIG. 2 and corresponding to sensor elements 116 drawn in solid lines in FIG. 1, the sensor elements in row 120 may produce sensed image data pixels of respective surface resolution cells corresponding to (or having) an along-track dimension L2, and respective across-track dimensions W1, W2, W3, W4. Also, during time T2, the sensor elements in row 122 may produce sensed image data pixels of respective surface resolution cells that were previously respectively sensed by the sensor elements of row 120 during time T1. As shown, the sensed image data pixel corresponding to (or associated with) sensor element 118*j* during time T2 may indicate that object 115 has vacated cell 134. Further, the sensed image data pixel corresponding to sensor element 118*b* during time T2 may indicate that object 115 is now located in (or has moved to) surface resolution cell 130 (e.g., corresponding to a second geographical location).

During a third recording interval of time T3, as depicted in FIG. 2 and corresponding to sensor elements 116 in a position between where sensor elements 116 are drawn in solid lines in FIG. 1 and where sensor elements 116 are drawn in dash dot lines in FIG. 1, the sensor elements of row 120 may produce sensed image data pixels of respective surface resolution cells corresponding to (or having) an along-track dimension L3, and respective across-track dimensions W1, W2, W3, W4. Further, during time T3, the sensor elements in row 122 may produce sensed image data pixels of respective surface resolution cells that were previously respectively sensed by the sensor elements of row 120 during time T2. Moreover, during time T3, the sensor elements in row 124 may produce sensed image data pixels of respective surface resolution cells that were previously respectively sensed by the sensor elements of row 122 during time T2. As shown, the sensed image data pixel corresponding to sensor element 118*c* during time T3 may indicate that object 115 is still located in surface resolution cell 130.

During a fourth recording interval of time T4, as depicted in FIG. 2 and corresponding to sensor elements 116 in FIG. 1 drawn in dash dot lines, the sensor elements of row 120 may produce sensed image data pixels of respective surface resolution cells corresponding to (or having) an along-track dimension L4, and respective across-track dimensions W1, W2, W3, W4. Further, during time T4, the sensor elements in row 122 may produce sensed image data pixels of respective surface resolution cells that were previously respectively sensed by the sensor elements of row 120 during time T3. Moreover, the sensor elements in row 124 may produce sensed image data pixels of respective surface resolution cells that were previously respectively sensed by the sensor elements of row 122 during time T3. Also, the sensor elements in row 126 may produce sensed image data pixels of respective surface resolution cells that were previously respectively sensed by the sensor elements of row 124 during time T3. As shown, the sensed image data pixel corresponding to sensor element 118*d* during time T4 may indicate that object 115 has vacated surface resolution cell 130. Further, the sensed image data pixel corresponding to sensor element 118*c* during time T4 may indicate that object 115 is now located in (or has moved to) a surface resolution cell 138 (e.g., corresponding to a third geographical location).

While not explicitly shown in FIG. 2, but may still be inferred, particularly with reference to FIG. 1, during time T2, the sensor elements of row 124 may produce sensed image data pixels of respective surface resolution cells having along-track dimension L5 disposed directly to the left of surface resolution cells 130, 132, 134, 136 in FIG. 1. Also during time T2, the sensor elements of row 126 may produce sensed image data pixels of respective surface resolution cells having along-track dimension L6 disposed further to the left of surface resolution cells 130, 132, 134, 136 in FIG. 1.

System 100 may include any suitable mechanism, apparatus, structure, device, circuitry, or programming for substantially aligning the rows of sensed image data pixels produced by sensor elements 116 during a plurality of recording intervals of time (e.g., as is shown in FIGS. 1 and 2), which may enable redundant recorded sensed image data pixels to be more easily identified and/or transmission thereof to be reduced, as well as reducing overhead processing time when compressing the sensed image data pixels.

For example, controller 106 (see FIG. 1) may be operatively coupled to image sensing system 102 and configured to record one or more sets of sensed image data pixels. Each set of the sensed image data pixels may include the M rows of N sensed image data pixels at each of the plurality of sequential recording intervals of time, such as times T1, T2, T3, T4. Further, control component 107 of controller 106 may be operatively coupled to image sensing system 102. Control component 107 may be configured to generate one or more control signals for controlling one or more of (a) a velocity of image sensing system 102 relative to surface S1, (b) a distance of image sensing system 102 from surface S1, and (c) a rate of recording the sensed image data pixels (e.g., a time displacement of times T1, T2, T3, T4 relative to one another). In some embodiments, controlling the velocity of imaging sensing system 102 relative to surface S1 may involve controlling (e.g., adjusting, altering, and/or maintaining) a position of image sensing system 102 relative to surface S1 (e.g., with respect to time), and/or controlling an acceleration of image sensing system 102 relative to surface S1. In some embodiments, controlling one or more of (a), (b), and (c) may be performed by a control or feedback loop, such as a proportional-integral-derivative (PID) control loop, which may be included in or implemented by controller 106. For example, the feedback loop may be configured to align image sensing system 102, such that sensor elements 116 produce sensed image data pixels of the same surface resolution cell in different recording intervals of time.

For example, controlling one or more of (a), (b), and (c) by controller 106 may be configured such that each recording interval of time is within a threshold amount of being equal to an integral number m times a time it takes for image sensing system 102 to move relative to surface S1 the along-track dimension. For example, m may be less than M, which may result in different sensor elements (or the same sensor element) of sensor elements 116, at different times, producing sensed imaged data pixels for the same surface resolution cell corresponding to the same (or substantially the same) geographic region.

For example, in FIG. 2, m is equal to one (1), as sensor elements 116 are shown moving one along-track dimension between each of sequential times T1, T2, T3, T4. In particular, sensor elements 116 are shown as moving one along-track dimension L2 between times T1, T2, as moving one along-track dimension L3 between times T2, T3, and as moving one along-track dimension L4 between times T3, T4, with dimensions L1, L2, L3, L4 being substantially equal to one another.

In other embodiments, m may be equal to two (2), or any other suitable integer, which may be chosen to fit a particular application, or may be determined for a desired level of compression. Further, while sensor elements 116 are shown as being precisely aligned with previously recorded surface resolution cells (e.g., with the threshold amount being about zero), in some embodiments, the threshold amount may be greater. For example, the threshold amount may be relatively small for higher resolution applications. For example, the threshold amount may correspond to a time it takes for the image sensing system to move about one (1) decimeter. However, in some embodiments, the threshold amount may be greater, such as in applications with lower resolution parameters. Further, while dimensions L1, L2, L3, L4 and W1, W2, W3, W4 are shown as being respectively equal to one another, in other embodiments these dimensions may vary. In such cases, controller 106 may be configured to determine a suitable m value for aligning at least two of the sensor elements (or at least one sensor element) with the same surface resolution cell in different recording intervals of time so that base and/or change image data can be determined for that particular surface resolution cell, as will be described below in more detail.

To determine how to control one or more of (a), (b), and (c), as described above, controller 106 (e.g., control component 107) may be configured to determine the velocity (e.g., of image sensing system 102 in direction D1) and an altitude A1 of image sensing system 102 relative to surface S1 using satellite navigation system 111. Accordingly, controller 106 may be configured to control one or more of (a), (b), and (c) based (at least in part) on the determined velocity and altitude A1. For example, satellite navigation system 111 may provide information for determining one or more of position, course, distance traveled, and the amount of time spent traveling. For example, system 111 may include one or more components and/or functionalities of an available satellite or other navigation system, such as the Global Positioning System (GPS), the Global Navigation Satellite System (GLONASS), and/or the BeiDou-2 system. Additionally and/or alternatively, system 111 may include one or more components and/or functionalities described in one or more of the publications incorporated above in the Cross-References, such as one or more global positioning satellites, one or more low Earth orbit (LEO) satellites, and/or one or more ground reference stations, which may each be configured to transmit a signal to receiver 110. Receiver 110 may be operatively coupled to platform 104 and may have a predetermined (or determinable) orientation with respect to image sensing system 102. Based on the received signals, receiver 110 (and/or control component 107 of controller 106, which in some embodiments may include receiver 110) may be configured to determine a position of image sensing system 102 (e.g., the position of sensor elements 116) to within a relatively narrow window of space and time, such as within one decimeter and 0.33 nanoseconds. Such a determination may enable controller 106 to precisely control one or more of (a), (b), and (c) to precisely align sensor elements 116 with at least one previously recorded surface resolution cell.

For example, controller 106 (e.g., control component 107) may be configured to determine an orientation (e.g., a degree of roll, pitch, and/or yaw about the respective x, y, and z axes) of image sensing system 102 relative to platform 104 and/or relative to a nadir (e.g., a direction directly below image sensing system 102 and/or platform 104 and normal to surface S1). Controller 106 (e.g., control component 107) may further be configured to determine a surface resolution cell size of one or more of the surface resolution cells (e.g., the along-track and across-track dimensions of one or more of the surface resolution cells) on surface S1 based at least in part on the determined altitude A1 and image sensing system orientation. Further, controller 106 (e.g., control component 107) may be configured to determine the time it takes for image sensing system 102 to move relative to surface S1 the along-track dimension of one or more of the surface resolution cells based at least in part on the determined velocity and surface cell resolution size. Assuming for example, if the recording rate is 600 frames per second, and a sensor element produces a sensed image data pixel (e.g., senses image data) for a surface resolution cell having an along-track dimension of 1 ft, then the velocity of platform 104 may be controlled by controller 106 (e.g., by control component 107) such that its magnitude is equal to 409.09 MPH (e.g., (600 frames/second)*(1 mile/5280 ft)* (3600 seconds/hr)=409.09 MPH~=410 MPH). However, if the magnitude of this velocity is below a preferred velocity magnitude of platform 104, then controller 106 may increase the recording rate and/or decrease altitude A1 to align different sensor elements on the same surface resolution cell in different recording intervals of time, depending on any external constraints to these dimensions. In some cases, controller 106 may be configured to alter (e.g., increase) the m value to achieve alignment. It will be appreciated that even for frames that capture m new lines of pixels for each frame, the m new lines may be transmitted to a base station, such as ground station 114, at the rate of one line of pixels per advancement of each surface resolution cell width, although select previously transmitted or redundant pixels may also be transmitted. This then is the same data rate as when the image sensing system advances one new line of surface resolution cells each frame.

In some embodiments, image sensing system 102 may be configured to send one or more signals to controller 106, which may indicate a current image sensing system sampling speed of image sensing system 102, a variable line rate of image sensing system 102 (e.g., a time between successive frames), and/or a pixel size for the sensor elements. For example, one or more sensors, such as satellite navigation and/or positioning system 111 and/or one or more inertial movement sensors (not shown), may be configured to send one or more signals to controller 106, which may indicate a ground speed of image sensing system 102 relative to surface S1, an airspeed (or satellite speed) of platform 104, a distance of image sensing system 102 from surface S1, direction of travel D1, a change of direction of travel, and/or an acceleration of image sensing system 102. Based at least in part on one or more of these signals, controller 106 (e.g., control component 107) may adjust the sample speed of image sensing system 102, the line rate of image sensing system 102, a pixel rate of image sensing system 102 (e.g., a sample rate of sensor elements across a row), and/or the pixel size of one or more of the sensor elements. Further, based at least in part on one or more of the above described signals, controller 106 may communicate with a navigation and/or positioning system of platform 104, such as by sending appropriate control signals, to adjust a flyover speed of platform 104, a ground speed of platform 104, a location of platform 104, an acceleration or deceleration of platform 104, and/or an altitude of platform 104 above surface S1. Similar to the control described above, one or more of these functions of controller 106 may be configured to substantially align different sensor elements (or the same sensor element) at different recording intervals of time with the same surface resolution cell.

As a result, as is depicted in FIG. 2, sensor elements 116 may produce a first frame (or pixel frame) F1 of sensed image data pixels during time T1, a second frame (or pixel frame) F2 of sensed image data pixels during time T2, a third frame (or pixel frame) F3 of sensed image data pixels during time T3, and a fourth frame (or pixel frame) F4 of sensed image data pixels during time T4, all of which may be recorded by controller 106 (e.g., control component 107). For example, controller 106 may record frames F1, F2, F3, F4 during respectively correspondingly times T1, T2, T3, T4. In some embodiments, controller 106 may store one or more of frames F1, F2, F3, F4 (or one or more portions thereof) in one or more storage devices. The one or more storage devices may be accessible by controller 106 (e.g., by output component 108) and/or included in controller 106. More specifically, at least a subset of image data pixels from one or more of pixel frames F1, F2, F3, F4 may be stored in the one or more storage devices as reference image data pixels to which controller 106 (e.g., output component 108) may compare subsequently (or recently) recorded image data pixels to determine change image data, as will be described further below in continuing detail.

More generally, controller 106 may be configured to transmit a subset of the recorded image data pixels from one or more of frames F1, F2, F3, F4 to a receiver remote from image sensing system 102 (e.g., to relay platform 112, directly to ground station 114, and/or to ground station 114 via relay platform 112).

For example, output component 108 may be coupled to control component 107. Output component 108 may be configured to output to transmitter 109 for transmission as base image data from controller 106 to receiver 114 from controller 106, an image data pixel for each surface resolution cell from at least one pixel frame and less than a number of pixel frames that is equal to the highest integer less than M/m.

For example, for each recording of the sensed image data pixels produced by sensor elements 116, controller 106 may be configured to transmit (via output component 108 to transmitter 109 and then to relay platform 112) as base image data, the recorded image data pixel(s) corresponding to the first m rows of N sensed image data pixels in direction of travel D1. In particular, if m equals one, as shown in FIG. 2, then controller 106 may transmit (or output) recorded image data pixels 300, 310, 320, 330 in FIG. 3 corresponding to the sensor elements of row 120 during respective times T1, T2, T3, T4 as base image data. More specifically, output component 108 may be configured to output to pixels 300, 310, 320, 330 to transmitter 109 for transmission as base image data from controller 106 to ground station 114 (e.g., via relay platform 112). However, in embodiments where m equals two (2), controller 106 may be configured to transmit (e.g., via output from output component 108 to transmitter 109) base image data corresponding to the sensor elements of rows 120, 122 during each recording interval of time. The base image data (or a previously recorded frame) may be stored locally in controller 106 (e.g., as reference image data pixels) and may be used by controller 106 to compare subsequently recorded image data pixels, as will also be described below in more detail, which may allow controller 106 to avoid transmission of redundant recorded image data pixels.

In some embodiments, controller 106 may be configured to transmit (e.g., via output from output component 108 to transmitter 109) as base image data to the receiver remote from image sensing system 102 (e.g., ground station 114), the recorded image data pixel for a particular surface resolution cell at least one time and less than a number of times that is equal to the highest integer less than M/m. For example, in a case where M=1000 and m=25, controller 106 may be configured to transmit base image data corresponding to a particular surface resolution cell anywhere in a range from one time to 39 times. However, greater compression may be achieved when the base image data for the particular surface resolution cell is only transmitted once. For example, controller 106 may be configured to transmit only base image data in a frame for surface resolution cells for which image data has not previously been transmitted. For example, controller 106 may be configured to transmit as base image data the recorded image data pixel for a particular surface resolution cell only one time.

Controller 106 may be configured to not transmit, for one or more of the surface resolution cells, a recorded image data pixel that is substantially the same as a previously recorded image data pixel (e.g., the previously recorded image data pixel may be stored in the one or more storage devices as a reference image data pixel for the surface resolution cell) thereby reducing transmission of substantially redundant data (e.g., repeated recorded image data pixels of a road where no change or movement has occurred). For example, controller 106 may be configured to, for each recording of the sensed image data pixels, transmit (e.g., via output from output component 108 to transmitter 109) to ground station 114, a most recently recorded image data pixel for only those surface resolution cells for which there is no previously recorded image data pixel that is the same or is different by less than a (predetermined) threshold amount as the most recently recorded image pixel.

For example, at (or after) time T1, controller 106 may be configured to transmit (e.g., via output from output component 108 to transmitter 109) data 300 in FIG. 3 corresponding to row 120 in FIG. 2 during time T1 to ground station 114 because image sensing system 102 may not have previously recorded a sensed image data pixel of that particular geographical location.

Further, at (or after) time T2, frame F2 may include recently recorded image data pixels, and frame F1 may include previously recorded image data pixels. In frame F2, surface resolution cells 138, 142, 144, 146 may correspond respectively to the sensor elements of row 120 during time T2. As shown, since there is no previously recorded image data pixels for surface resolution cells 138, 142, 144, 146 in frame F1 (e.g., or currently stored reference image data pixels for cells 138, 142, 144, 146), controller 106 may be configured to transmit (e.g., via output from output component 108 to transmitter 109) corresponding recorded image data pixels 310 as base image data to ground station 114, as depicted in FIGS. 1 and 3. However, controller 106 may be configured to not transmit recorded image data pixels for one or more of the surface resolution cells corresponding to row 122 at time T2, if for example, those recorded image data pixels are different by less than the threshold amount when compared to corresponding surface resolution cells 130, 132, 134, 136 in frame F1 (e.g., which may be stored as reference image data pixels for the corresponding surface resolution cells of row 122 at time T2). For example, controller 106 (e.g., output component 108) may be configured to compare the recorded image data pixels for row 122 in frame F2 with the recorded image data pixels for row 120 in frame F1. For example, controller 106 (e.g., output component 108) may compare the data pixels using a suitable filter, such as an XOR mask. Based on the comparison, controller 106 (e.g., output component 108) may determine that cells 132, 136 in frame F2 are within the threshold amount as compared to cells 132, 136 in frame F1 (e.g., the appearance of surface S1 has not substantially changed in those associated geographical areas). Accordingly, controller 106 may not transmit recorded image data pixels for cells 132, 136 in frame F2. However, based on the comparison, controller 106 (e.g., output component 108) may determine that cells 130, 134 in frame F2 are not within the threshold amount as compared to cells 130, 134 in frame F1 (e.g., the appearance of surface S1 has substantially changed in those associated geographical areas, with object 115 being displaced from cell 130 to cell 134, as described above). Accordingly, at or after time T2, controller 106 may transmit (e.g., via output from output component 108 to transmitter 109) change image data 340 in FIG. 1 and FIG. 3 to ground station 114. As shown, change image data 340 may correspond to change image data for cells 130, 134, which may indicate the movement of object 115.

Similarly, controller 106 (e.g., output component 108) may be configured to compare frame F3 with frame F2 and not transmit recorded image data pixels for rows 122, 124 in frame F2. As can be seen in a region of FIG. 3 indicated as transmission of frame F3 corresponding to time T3, this avoidance of redundant data transmission is shown as "empty" (or non-textured) rows 122, 124, which may correspond to a transmission of zeroes for these rows, or another indicator of no change in the corresponding surface resolution cells. Similarly, cells 130, 132, 134, 136 are depicted as empty with no change in transmission of frame F3 corresponding to time T3 depicted in FIG. 3 with respect to frame F2 in time T2.

Further still, at or after time T4, controller 106 (e.g., output component 108) may be configured to compare, for each surface resolution cell for which base image data has been transmitted, one or more recently (e.g., most recently) recorded image data pixels, such as those of frame F4, with one or more previously recorded image data pixels, such as those of either of frames F1, F2, F3, but preferably with frame F3. Based at least in part on the comparison made by controller 106, controller 106 may transmit (e.g., via output from output component 108 to transmitter 109) to ground station 114 as change image data the (most) recently recorded image data pixel(s) when (or only if) the (most) recently recorded image data pixel(s) are different than the previously recorded image data pixel(s) by at least the threshold amount. For example, based on a comparison of rows 122, 124, 126 of frame F4 with rows 120, 122, 124 of frame F3, controller 106 may produce (or identify) change image data 350. Change image data 350 may correspond to an indication of change in recorded image data pixels for cells 130, 138 (e.g., showing the corresponding displacement of object 115), which may be transmitted to ground station 114 along with (or separate from) data 330. As also indicated in FIG. 3 (e.g., in the region labeled TX of F4), based on the comparison, such as an application of an XOR filter on rows 122, 124, 126 in frame F4 with respect to rows 120, 122, 124 in frame F3, change image data 350 may not include data for the other sensor elements of rows 122, 124, 126, which may result in the recorded image data pixels for these sensor elements not being transmitted to ground station 114.

Accordingly, base image data 300, 310, 320, 330 may be used to produce a substantially contiguous base image of surface S1, and change image data 340, 350 may form a delta map indicating changes of the base image over time.

Such transmission of base image data and change image data, and an avoidance of transmitting redundant recorded image data pixels, may significantly reduce processing overhead and enhance compression capabilities of system 100. For example, data 300, 310, 320, 330, 340, 350 may be compressed using any suitable method, such as for example, linear compression, line compression, or a version of MPEG, by controller 106 before transmission to ground station 114. By filtering out redundant recorded image data pixels, as described above, before compressing data 300, 310, 320, 330, 340, 350, real-time encoding and decoding when respectively compressing and decompressing data 300, 310, 320, 330, 340, 350 may be achieved.

For example, FIG. 4 depicts an overlay of data 300, 310, 320, 330, 340, 350, which may be produced at ground station 114 substantially in real-time. For example, a computing system at ground station 114 may receive encoded data 300, 310, 320, 330, 340, 350. The computing system may be configured to decode data 300, 310, 320, 330, 340, 350, and to display the overlay to an operator. As shown, the overlay may indicate that object 115 remains in cell 134 during times T1, T2, is in (or moves to) cell 130 in time T3, and is in (or moves to) cell 138 in time T4. Further, the overlay may indicate that an appearance of surface S1 has not substantially changed outside of those particular cells corresponding to those particular recording time intervals. For example, the overlay may be displayed as a substantially real-time video of object 115 moving from cell 134 to cell 130 to cell 138 in the associated time intervals. Such a real-time display may enable the operator, or other component of system 100, such as another aerial platform (not shown), to more accurately target object 115.

However, if a previous recording of the same surface is stored on the platform (e.g., from a previous flyover flight), and the sensed image data of the current flyover is within the threshold of the recorded data from the previous flyover, then only the change image data from the current flyover may be transmitted to ground station 114. This change image data from the current flyover may then be overlaid with (and/or compared to) the recording from the previous flyover, and displayed and/or used for targeting and/or other observational purposes.

Example 2

Figure 5:
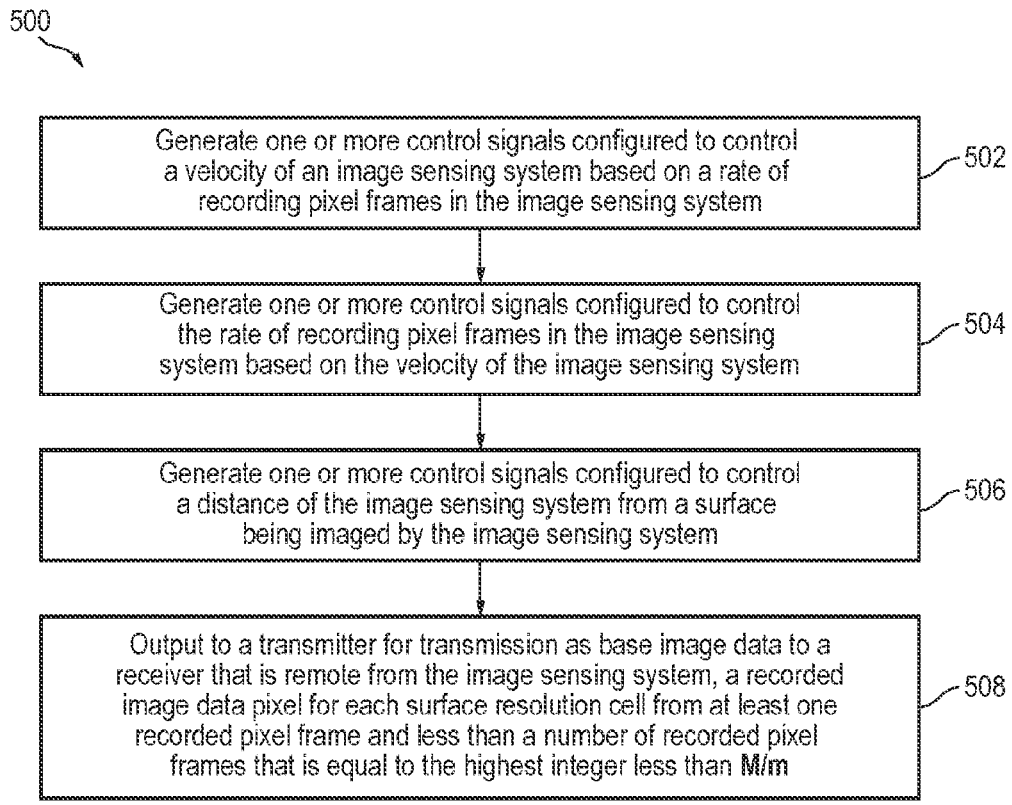
FIG. 5 is a flowchart depicting a method.

This example describes a method, which may be used to transmit base image data; see FIG. 5.

FIG. 5 is a flowchart illustrating steps performed in an illustrative method, and may not recite the complete process or all steps of the program. In particular, FIG. 5 depicts multiple steps of a method, generally indicated at 500. Although various steps of method 500 are described below and depicted in FIG. 5, the steps need not necessarily all be performed, and in some cases may be performed in a different order than the order shown.

Method 500 may include one or more steps of generating one or more control signals. Such control signals may be configured to control one or more components of one or more of the systems disclosed herein, which may improve data compression and/or transmission. For example, method 500 may include a step 502 of generating one or more control signals configured to control a velocity of an image sensing system based on a rate of recording pixel frames (e.g., frames F1, F2, F3, and/or F4) in the image sensing system. For example, the image sensing system may be moving in a direction of travel relative to the surface that is spaced from the image sensing system. The image sensing system may include one or more sensor elements for recording a pixel frame including at least M adjacent rows each having at least one image data pixel, with each image data pixel corresponding to a surface resolution cell of the surface determined by an instantaneous field of view of the surface by the associated sensor element. The M rows may be disposed along the direction of travel, where M may be an integer greater than one, and each surface resolution cell may have an along-track dimension in the direction of travel. In such an embodiment, generating one or more control signals at step 502 may include generating one or more control signals to control the velocity such that each recording interval of time associated with recording of the pixel frames is within a threshold amount of time equal to m multiplied by a time it takes for the image sensing system to move the along-track dimension relative to the surface, where m is an integer less than M.

Method 500 may further include, or may include instead of step 502, a step 504 of generating one or more control signals configured to control the rate of recording pixel frames in the image sensing system based on the velocity of the image sensing system. Similar to step 502, control signals generated at step 504 may be configured to control the rate of recording pixel frames such that each recording interval of time associated with recording of the pixel frames is within the threshold amount of time.

Method 500 may further include, in addition to or instead of one or both of steps 502 and 504, a step 506 of generating one or more control signals configured to control a distance of the image sensing system from a surface being imaged by the image sensing system, such as altitude A1 of image sensing system 102 relative to surface S1 in FIG. 1. Similar to step 502, control signals generated at step 506 may be configured to control the distance of the image sensing system from the surface such that each recording interval of time associated with recording of the pixel frames is within the threshold amount of time. For example, a shorter distance (e.g., lower altitude) may result in a shorter along-track dimension, which may be tailored so that the each recording interval of time is within the threshold amount of time.

Method 500 may further include a step 508, which step may follow one or more of steps 502, 504, and 506. Step 508 may include outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m. In some embodiments, one or more of the recorded image data pixels that are output at step 508 may be compressed (e.g., by a controller, such as controller 106 shown in FIG. 1) prior to being output to the transmitter. In some embodiments, the image sensing system may be supported by an aerial platform, and the receiver may be a ground station, similar to the example depicted in FIG. 1.

In some embodiments of step 508, outputting as base image data the recorded image data pixel for each cell may include outputting as base image data (or a base image data pixel) the recorded image data pixel for the surface resolution cell only one time.

In some embodiments of step 508, for each surface resolution cell, outputting as base image data, a recorded image data pixel may include, outputting to the transmitter for transmission as base image data to the receiver, the recorded image data pixels corresponding to the first m rows of recorded image data pixels in the direction of travel. For example, step 508 may involve outputting data 300, 310, 320, 330 from output component 108 to transmitter 109 for transmission of data 300, 310, 320, 330 to ground station 114.

Method 500 may further comprise a step of comparing, for each surface resolution cell for which base image data has been output, a recently recorded image data pixel with a previously recorded image data pixel, and outputting the recently recorded image data pixel to the transmitter for transmission to the receiver as change image data (or a change image data pixel) when the recently recorded image data pixel is different than the previously recorded image data pixel by at least a threshold amount. In some embodiments, the recently recorded image data pixel may be a most recently recorded image data pixel. For example, the output change data may include data 340, 350.

In some embodiments of method 500, the surface may be the surface of the earth, and method 500 may further comprise determining the velocity and altitude of the image sensing system relative to the surface of the earth using a satellite navigation and/or positioning system, such as system 111 depicted in FIG. 1. Determining the velocity and altitude of the image sensing system may inform how the system may be controlled so that each recording interval of time is equal to an integral number m times a time it takes for the image sensing system to move relative to the surface of the earth the along-track dimension of a surface resolution cell. For example, the determination of the velocity and altitude of the image sensing system relative to the surface of the earth may be performed prior to (and may form a basis for) controlling one or more of (a) the velocity of the image sensing system relative to the surface (e.g., at or associated with step 502), (b) the distance of the image sensing system from the surface (e.g., at or associated with step 506), and (c) the rate of recording the pixel frames (e.g., at or associated with step 504).

For example, in some embodiments, method 500 may further comprise steps of determining an orientation of the image sensing system relative to a platform supporting the image sensing system, such as platform 104, and/or relative to a nadir (e.g., of one or more of the image sensing system and the platform, relative to the surface of the earth), determining a surface resolution cell size on the surface of the earth based at least in part on the determined altitude and image sensing system orientation, and determining the time it takes for the image sensing system to move relative to the surface the along-track dimension of the surface resolution cell based at least in part on the determined velocity and surface resolution cell size.

In some embodiments, each of the pixel frames may be produced by p adjacent rows of n adjacent sensor elements of the image sensing system. The value p may be a positive integer less than or equal to M. The value n may be a positive integer less than or equal to a number of image data pixels in each of the M rows. In such a case, outputting base image data at step 508 may include outputting for each recorded pixel frame, only base image data for surface resolution cells not previously output to the transmitter for transmission to the receiver.

In some embodiments, transmitting base image data at step 508 may include outputting base image data from a pixel frame for only surface resolution cells for which base image data has not previously been output to the transmitter for transmission to the receiver.

However, in some embodiments, the image sensing system may have previously produced an image data pixel for a particular surface resolution cell in a previous recording and/or storing sequence, such as a previous flyover, but may not be currently considering (or storing, or have access to) that previously produced image data pixel. In such embodiments, step 508 may involve outputting a recently produced imaged data pixel as base image data for that particular surface resolution cell even though the previously produced image data pixel was previously output (or transmitted). For example, in a previous orbit of Earth, an imaging satellite may have transmitted a first image data pixel for the particular surface resolution cell. In a subsequent (or current, or recent) orbit, the imaging satellite may produce a second image data pixel for the particular surface resolution cell. However, the imaging satellite may no longer have access to the first image data pixel (or data corresponding thereto) for comparison to the second image data pixel, and thus may output the second image data pixel as base image data to a transmitter for transmission to the receiver.

Method 500 may further comprise a step of comparing, for each surface resolution cell for which base image data has been output, a recently recorded image data pixel with previously output base or change image data (e.g., a previously transmitted or output base or change image data pixel).

Method 500 may further comprise a step of outputting to the transmitter for transmission to the receiver as change image data the recently recorded image data pixel only if the recently recorded image data pixel is different than the previously recorded image data pixel by at least a threshold amount.

Example 3

Figure 6:
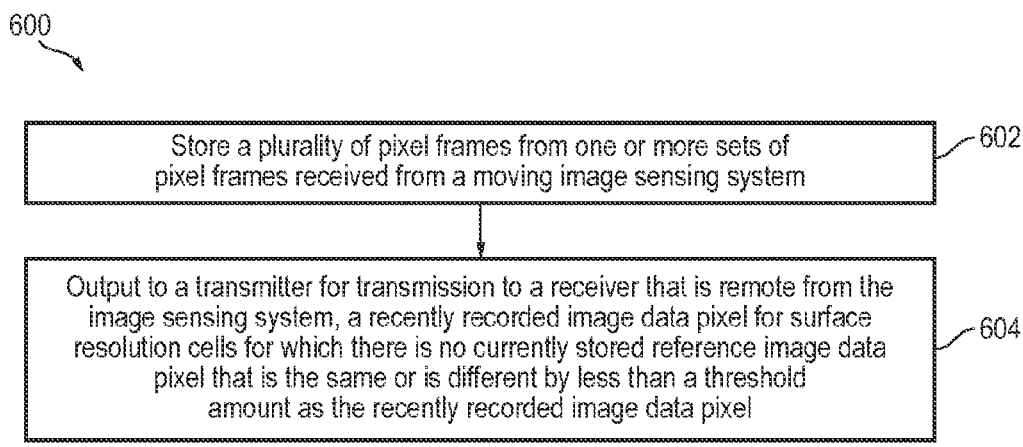
FIG. 6 is a flowchart depicting another method.

This example describes a method, which may be used to transmit change image data; see FIG. 6.

FIG. 6 is a flowchart illustrating steps performed in an illustrative method, and may not recite the complete process or all steps of the program. In particular, FIG. 6 depicts multiple steps of a method, generally indicated at 600. Although various steps of method 600 are described below and depicted in FIG. 6, the steps need not necessarily all be performed, and in some cases may be performed in a different order than the order shown.

Method 600 may include a step 602 of storing a plurality of pixel frames, such as frames F1, F2, F3, F4 depicted in FIG. 2. The plurality of pixel frames may be taken from one or more sets of pixel frames received from an image sensing system, such as image sensing system 102 depicted in FIG. 1. The image sensing system may be moving in a direction of travel relative to a surface being imaged. The surface may be spaced from the image sensing system. The image sensing system may have one or more sensor elements for producing the one or more sets of pixel frames. Each pixel frame may include at least M adjacent rows each having at least one image data pixel. Each image data pixel may correspond to a surface resolution cell of the surface determined by an instantaneous field of view of the surface by the associated sensor element. The M rows may be disposed along the direction of travel. M may be an integer greater than one. Each surface resolution cell may have an along-track dimension in the direction of travel. Each set of pixel frames may include pixel frames recorded at each of a plurality of sequential recording intervals of time. Each recording interval of time may be within a threshold amount of time equal to m multiplied by a time it takes for the image sensing system to move the along-track dimension relative to the surface, where m may be an integer less than M. In some embodiments, the plurality of pixel frames may be stored in one or more storage devices associated with, accessible by, and/or included in a controller associated with the image sensing system, such as controller 106 associated with image sensing system 102.

Method 600 may further comprise a step 604 of outputting to a transmitter for transmission to a receiver that is remote from the image sensing system, a recently recorded image data pixel for those surface resolution cells for which there is no currently stored reference image data pixel of a previously recorded pixel frame that is the same or is different by less than a threshold amount as the recently recorded image data pixel. In some embodiments, step 604 may involve outputting the recently recorded image data pixel if there is no reference image data pixel of a previously recorded pixel frame currently stored in the one or more storage devices that is the same or is different by less than the threshold amount as the recently recorded image data pixel.

Method 600 may further comprise a step of generating one or more control signals configured to control one or more of (a) a velocity of the image sensing system relative to the surface, (b) a distance of the image sensing system from the surface, and (c) a rate of recording the pixel frames so that each recording interval of time is within the threshold amount of time. In some embodiments, controlling the velocity of the imaging sensing system relative to the surface may involve controlling (e.g., adjusting, altering, and/or maintaining) a position of the image sensing system relative to the surface (e.g., with respect to time), and/or controlling an acceleration (e.g., a deceleration) of the image sensing system relative to the surface.

In some embodiments, the surface may be the surface of the earth, and the method may further comprise determining the velocity and altitude of the image sensing system relative to the surface of the earth using a satellite navigation and/or positioning system prior to the generating step.

In some embodiments, method 600 may further comprise a step of determining an orientation (e.g., position and/or rotation in an x, y, z coordinate system) of the image sensing system relative to a platform supporting the image sensing system (e.g., platform 104) and/or relative to a nadir (e.g., of one or more of the image sensing system and the platform, relative to the surface), determining a surface resolution cell size on the surface of the earth based at least in part on the determined altitude and image sensing system orientation, and determining the time it takes for the image sensing system to move the along-track dimension relative to the surface based at least in part on the determined velocity and surface resolution cell size.

Example 4

Figure 7:
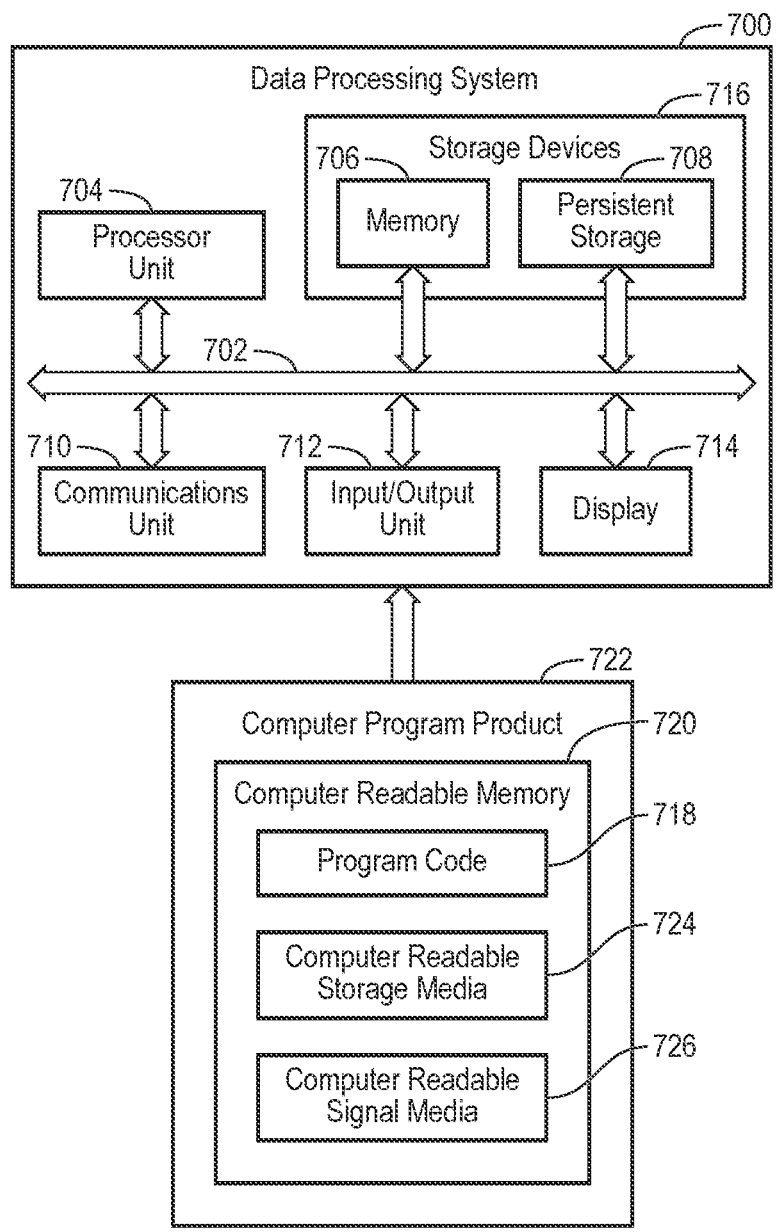
FIG. 7 is a schematic diagram of various components of an illustrative data processing system.

This example describes a data processing system 700 in accordance with aspects of the present disclosure. In this example, data processing system 700 is an illustrative data processing system for implementing one or more of the foregoing components, such as controller 106 (e.g., control component 107 and/or output component 108), and/or functionalities, such as the overlay at ground station 114; see FIG. 7.

In this illustrative example, data processing system 700 includes communications framework 702. Communications framework 702 provides communications between processor unit 704, memory 706, persistent storage 708, communications unit 710, input/output (I/O) unit 712, and display 714. Memory 706, persistent storage 708, communications unit 710, input/output (I/O) unit 712, and display 714 are examples of resources accessible by processor unit 704 via communications framework 702.

Processor unit 704 serves to run instructions of software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis.

Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications framework 702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 5

This section describes additional aspects and features of embodiments of the disclosure, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method comprising: directing an image sensing system at a surface spaced from the image sensing system and moving in a direction of travel relative to the image sensing system, the image sensing system having one or more sensor elements for producing at least M adjacent rows of at least N adjacent sensed image data pixels, with each sensed image data pixel corresponding to a surface resolution cell of the surface determined by an instantaneous field of view of the surface by the associated sensor element, with the sensed image data pixels in each row disposed in a line transverse to the direction of travel and the M rows disposed along the direction of travel, where M and N are positive integers, M is greater than one, and each surface resolution cell has an along-track dimension in the direction of travel; recording one or more sets of sensed image data pixels, where each set of sensed image data pixels includes the M rows of N sensed image data pixels at each of a plurality of sequential recording intervals of time; controlling one or more of (a) a velocity of the image sensing system relative to the surface, (b) a distance of the image sensing system from the surface, and (c) a rate of recording the sensed image data pixels so that each recording interval of time is within a threshold amount of being equal to an integral number m times a time it takes for the image sensing system to move relative to the surface the along-track dimension, where m is less than M; and for each surface resolution cell, transmitting as base image data to a receiver remote from the image sensing system from the one or more sets of sensed image data pixels, the recorded image data pixel for the surface resolution cell at least one time and less than a number of times that is equal to the highest integer less than M/m.

A1. The method of paragraph A0, wherein transmitting as base image data the recorded image data pixel includes transmitting as base image data the recorded image data pixel for the surface resolution cell only one time.

A2. The method of paragraph A0, wherein for each surface resolution cell, transmitting as base image data to a receiver remote from the image sensing system from the one or more sets of sensed image data pixels, the recorded image data pixel includes, for each recording of the one or more sets of sensed image data pixels, transmitting as base image data to the receiver remote from the image sensing system, the recorded image data pixels corresponding to the first m rows of N sensed image data pixels in the direction of travel.

A3. The method of paragraph A0, further comprising comparing, for each surface resolution cell for which base image data has been transmitted, a most recently recorded image data pixel with a previously recorded image data pixel, and transmitting to the remote receiver as change image data the most recently recorded image data pixel when the most recently recorded image data pixel is different than the previously recorded image data pixel by at least a threshold amount.

A4. The method of paragraph A0, where the surface is the surface of the earth, the method further comprising, prior to controlling one or more of (a) the velocity of the image sensing system relative to the surface, (b) the distance of the image sensing system from the surface, and (c) the rate of recording the sensed image data pixels so that each recording interval of time is equal to an integral number m times a time it takes for the image sensing system to move relative to the surface the along-track dimension of a surface resolution cell, determining the velocity and an altitude of the image sensing system relative to the surface of the earth using a satellite navigation system.

A5. The method of paragraph A4, further comprising determining an orientation of the image sensing system relative to a nadir (e.g., associated with a platform, which may be supporting the image sensing system), determining the surface resolution cell size on the surface of the earth based at least in part on the determined altitude and image sensing system orientation, and determining the time it takes for the image sensing system to move relative to the surface the along-track dimension of the surface resolution cell based at least in part on the determined velocity and surface resolution cell size.

A6. The method of paragraph A5, where the image sensing system has p rows of n sensor elements that produce a frame of the sensed image data pixels corresponding to the at least M adjacent rows of at least N adjacent sensed image data pixels, where p is a positive integer less than or equal to M and n is a positive integer less than or equal to N, and wherein transmitting base image data includes transmitting for each recorded frame, only base image data for surface resolution cells not previously transmitted.

A7. The method of paragraph A6, further comprising comparing, for each surface resolution cell for which base image data has been transmitted, a most recently recorded image data pixel with a previously transmitted base or change image data, and transmitting to the remote receiver as change image data the most recently recorded image data pixel only if the most recently recorded image data pixel is different than the previously recorded image data pixel by at least a threshold amount.

A8. The method of paragraph A0, where the image sensing system has p rows of n sensor elements that produce a frame of the sensed image data pixels corresponding to the at least M adjacent rows of at least N adjacent sensed image data pixels, where p is a positive integer less than or equal to M and n is a positive integer less than or equal to N, and wherein transmitting base image data includes transmitting only base image data in a frame for surface resolution cells for which base image data has not previously been transmitted.

B0. A method comprising: directing an image sensing system at a surface spaced from the image sensing system and moving in a direction of travel relative to the image sensing system, the image sensing system having one or more sensor elements for producing at least M adjacent rows of at least N adjacent sensed image data pixels, with each sensed image data pixel corresponding to a surface resolution cell of the surface determined by an instantaneous field of view of the surface by the associated sensor element, with the sensed image data pixels in each row disposed in a line transverse to the direction of travel and the M rows disposed along the direction of travel, where M and N are positive integers, M is greater than one, and each surface resolution cell has an along-track dimension in the direction of travel; recording one or more sets of sensed image data pixels, where each set of sensed image data pixels includes the M rows of N sensed image data pixels at each of a plurality of sequential recording intervals of time, with each recording interval of time being within a threshold amount of being equal to an integral number m times a time it takes for the image sensing system to move relative to the surface the along-track dimension of a surface resolution cell, where m is less than M; and for each recording of the M rows of N sensed image data pixels, transmitting to a receiver remote from the image sensing system, a most recently recorded image data pixel for only those surface resolution cells for which there is no previously recorded image data pixel that is the same or is different by less than a threshold amount as the most recently recorded image data pixel.

B1. The method of paragraph B0, further comprising controlling one or more of (a) a velocity of the image sensing system relative to the surface, (b) a distance of the image sensing system from the surface, and (c) a rate of recording the sensed image data pixels so that each recording interval of time is within the threshold amount of being equal to the integral number m times a time it takes for the image sensing system to move relative to the surface the along-track dimension.

B2. The method of paragraph B1, where the surface is the surface of the earth, the method further comprising, prior to controlling one or more of (a) the velocity of the image sensing system relative to the surface, (b) the distance of the image sensing system from the surface, and (c) the rate of recording the sensed image data pixels so that each recording interval of time is equal to an integral number m times a time it takes for the image sensing system to move relative to the surface the along-track dimension of a surface resolution cell, determining the velocity and altitude of the image sensing system relative to the surface of the earth using a satellite navigation system.

B3. The method of paragraph B2, further comprising determining an orientation of the image sensing system relative to a nadir, determining the surface resolution cell size on the surface of the earth based at least in part on the determined altitude and image sensing system orientation, and determining the time it takes for the image sensing system to move relative to the surface the along-track dimension of the surface resolution cell based at least in part on the determined velocity and surface resolution cell size.

C0. A system comprising: an image sensing system configured to be supported by a platform disposed in spaced relationship from and moving in a direction of travel relative to a surface, the image sensing system having one or more sensor elements for producing at least M adjacent rows of at least N adjacent sensed image data pixels, with each sensed image data pixel corresponding to a surface resolution cell of the surface determined by an instantaneous field of view of the surface by the associated sensor element, with the sensed image data pixels in each row disposed in a line transverse to the direction of travel and the M rows disposed along the direction of travel, where M and N are positive integers, M is greater than one, and each surface resolution cell has an along-track dimension in the direction of travel; and a controller operatively coupled to the image sensing system and configured to record one or more sets of sensed image data pixels, where each set of sensed image data pixels includes the M rows of N sensed image data pixels at each of a plurality of sequential recording intervals of time, the controller further being configured to control one or more of (a) a velocity of the image sensing system relative to the surface, (b) a distance of the image sensing system from the surface, and (c) a rate of recording the sensed image data pixels so that each recording interval of time is within a threshold amount of being equal to an integral number m times a time it takes for the image sensing system to move relative to the surface the along-track dimension, where m is less than M; and the controller further being configured to transmit as base image data to a receiver remote from the image sensing system from the one or more sets of sensed image data pixels, the recorded image data pixel for each surface resolution cell at least one time and less than a number of times that is equal to the highest integer less than M/m.

C1. The system of paragraph C0, wherein the controller is further configured to transmit as base image data the recorded image data pixel for each surface resolution cell only one time.

C2. The system of paragraph C0, wherein the controller is further configured, for each recording of the M rows of N sensed image data pixels produced by the one or more sensor elements, to transmit as base image data to the receiver remote from the image sensing system from the one or more sets of sensed image data pixels, the recorded image data pixels corresponding to the first m rows of N sensed image data pixels in the direction of travel.

C3. The system of paragraph C0, wherein the controller is further configured to compare a most recently recorded image data pixel with a previously recorded image data pixel for each surface resolution cell for which base image data has been transmitted, and transmit to the remote receiver as change image data the most recently recorded image data pixel when the most recently recorded image data pixel is different than the previously recorded image data pixel by at least a threshold amount.

C4. The system of paragraph C0, where the surface is the surface of the earth, wherein the controller is further configured to determine the velocity and altitude of the image sensing system relative to the surface of the earth using a satellite navigation system, and to control one or more of (a) the velocity of the image sensing system relative to the surface, (b) the distance of the image sensing system from the surface, and (c) the rate of recording the sensed image data pixels based on the determined velocity and altitude.

C5. The system of paragraph C4, wherein the controller is further configured to determine an orientation of the image sensing system relative to a nadir, determine the surface resolution cell size on the surface of the earth based at least in part on the determined altitude and image sensing system orientation, and determine the time it takes for the image sensing system to move relative to the surface the along-track dimension of the surface resolution cell based at least in part on the determined velocity and surface resolution cell size.

C6. The system of paragraph C0, where the image sensing system has p rows of n sensor elements that produce a frame of the sensed image data pixels corresponding to the at least M adjacent rows of at least N adjacent sensed image data pixels, where p is a positive integer less than or equal to M and n is a positive integer less than or equal to N, and wherein the controller is further configured to transmit only base image data in a frame for surface resolution cells for which image data has not previously been transmitted.

D0. A method comprising: generating one or more control signals configured to control one or more of (a) a velocity of an image sensing system moving in a direction of travel relative to a surface being imaged that is spaced from the image sensing system, the image sensing system having one or more sensor elements for recording a pixel frame including at least M adjacent rows each having at least one image data pixel, with each image data pixel corresponding to a surface resolution cell of the surface determined by an instantaneous field of view of the surface by the associated sensor element, with the M rows disposed along the direction of travel, where M is an integer greater than one, and each surface resolution cell has an along-track dimension in the direction of travel, (b) a distance of the image sensing system from the surface, and (c) a rate of recording pixel frames, such that each recording interval of time associated with recording of the pixel frames is within a threshold amount of time equal to m multiplied by a time it takes for the image sensing system to move the along-track dimension relative to the surface, where m is an integer less than M; and outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m.

D1. The method of paragraph D0, wherein outputting as base image data the recorded image data pixel for each cell includes outputting as base image data the recorded image data pixel for the surface resolution cell only one time.

D2. The method of paragraph D0, wherein for each surface resolution cell, outputting as base image data, a recorded image data pixel includes outputting to the transmitter for transmission as base image data to the receiver, the recorded image data pixels corresponding to the first m rows of recorded image data pixels in the direction of travel.

D3. The method of paragraph D0, further comprising comparing, for each surface resolution cell for which base image data has been output, a recently recorded image data pixel with a previously recorded image data pixel, and outputting the recently recorded image data pixel to the transmitter for transmission to the receiver as change image data when the recently recorded image data pixel is different than the previously recorded image data pixel by at least a threshold amount.

D4. The method of paragraph D0, where the surface is the surface of the earth, the method further comprising, prior to generating the one or more control signals, determining the velocity and an altitude of the image sensing system relative to the surface of the earth using a satellite navigation system.

D5. The method of paragraph D4, further comprising determining an orientation of the image sensing system relative to a nadir, determining a surface resolution cell size on the surface of the earth based at least in part on the determined altitude and image sensing system orientation, and determining the time it takes for the image sensing system to move the along-track dimension relative to the surface based at least in part on the determined velocity and surface resolution cell size.

D6. The method of paragraph D5, where each of the pixel frames are produced by p rows of n sensor elements of the image sensing system, where p is a positive integer less than or equal to M, and n is a positive integer less than or equal to a number of image data pixels in each of the M rows, and wherein outputting base image data includes outputting for each recorded pixel frame, only base image data for surface resolution cells not previously output to the transmitter for transmission to the receiver.

D7. The method of paragraph D6, further comprising comparing, for each surface resolution cell for which base image data has been output to the transmitter for transmission to the receiver, a recently recorded image data pixel with a previously output base or change image data, and outputting to the transmitter for transmission to the receiver as change image data the recently recorded image data pixel only if the recently recorded image data pixel is different than the previously recorded image data pixel by at least a threshold amount.

D8. The method of paragraph D0, where the image sensing system has p rows of n sensor elements that produce the pixel frames, where p is a positive integer less than or equal to M, and n is a positive integer less than or equal to a number of image data pixels in each of the M rows, and wherein outputting base image data includes outputting only base image data from a pixel frame for surface resolution cells for which base image data has not previously been output to the transmitter for transmission to the receiver.

E0. A method comprising: storing a plurality of pixel frames taken from one or more sets of pixel frames received from an image sensing system moving in a direction of travel relative to a surface being imaged, wherein the surface is spaced from the image sensing system, the image sensing system having one or more sensor elements for producing the one or more sets of pixel frames, where each pixel frame includes at least M adjacent rows each having at least one image data pixel, each image data pixel corresponding to a surface resolution cell of the surface determined by an instantaneous field of view of the surface by the associated sensor element, the M rows being disposed along the direction of travel, M being an integer greater than one, and each surface resolution cell having an along-track dimension in the direction of travel, where each set of pixel frames includes pixel frames recorded at each of a plurality of sequential recording intervals of time, with each recording interval of time being within a threshold amount of time equal to m multiplied by a time it takes for the image sensing system to move the along-track dimension relative to the surface, where m is an integer less than M; and outputting to a transmitter for transmission to a receiver that is remote from the image sensing system, a recently recorded image data pixel for those surface resolution cells for which there is no currently stored reference image data pixel of a previously recorded pixel frame that is the same or is different by less than a threshold amount as the recently recorded image data pixel.

E1. The method of paragraph E0, further comprising generating one or more control signals configured to control one or more of (a) a velocity of the image sensing system relative to the surface, (b) a distance of the image sensing system from the surface, and (c) a rate of recording the pixel frames so that each recording interval of time is within the threshold amount of time.

E2. The method of paragraph E1, where the surface is the surface of the earth, the method further comprising, prior to generating one or more control signals, determining the velocity and altitude of the image sensing system relative to the surface of the earth using a satellite navigation system.

E3. The method of paragraph E2, further comprising determining an orientation of the image sensing system relative to a nadir, determining a surface resolution cell size on the surface of the earth based at least in part on the determined altitude and image sensing system orientation, and determining the time it takes for the image sensing system to move the along-track dimension relative to the surface based at least in part on the determined velocity and surface resolution cell size.

F0. A controller comprising a control component and an output component: the control component being configured to be operatively coupled to an image sensing system, the image sensing system being supported by a platform disposed in spaced relationship from and moving in a direction of travel relative to a surface, the image sensing system having one or more sensor elements for producing one or more sets of pixel frames, where each pixel frame includes at least M adjacent rows each having at least one image data pixel, each image data pixel corresponding to a surface resolution cell of the surface determined by an instantaneous field of view of the surface by the associated sensor element, the M rows being disposed along the direction of travel, M being an integer greater than one, and each surface resolution cell having an along-track dimension in the direction of travel, the control component being configured to generate one or more control signals for controlling one or more of (a) a velocity of the image sensing system relative to the surface, (b) a distance of the image sensing system from the surface, and (c) a rate of recording the pixel frames, such that each recording interval of time associated with recording of the pixel frames is within a threshold amount of time equal to m multiplied by a time it takes for the image sensing system to move the along-track dimension relative to the surface, where m is an integer less than M; and the output component being coupled to the control component and configured to output to a transmitter for transmission as base image data from the controller to a receiver that is remote from the controller, an image data pixel for each surface resolution cell from at least one pixel frame and less than a number of pixel frames that is equal to the highest integer less than M/m.

F1. The controller of paragraph F0, wherein the output component is further configured to output to the transmitter for transmission as base image data from the controller to the receiver, the image data pixel for each surface resolution cell only one time.

F2. The controller of paragraph F0, wherein the output component is further configured, for each recorded pixel frame, to output to the transmitter for transmission as base image data the image data pixels of each pixel frame corresponding to the first m rows of image data pixels in the direction of travel.

F3. The controller of paragraph F0, wherein the output component is further configured to compare a recently recorded image data pixel with a previously recorded image data pixel for each surface resolution cell for which base image data has been transmitted, and to output to the transmitter for transmission as change image data to the receiver, the recently recorded image data pixel when the recently recorded image data pixel is different than the previously recorded image data pixel by at least a threshold amount.

F4. The controller of paragraph F0, where the surface is the surface of the earth, wherein the control component is further configured to determine the velocity and altitude of the image sensing system relative to the surface of the earth using a satellite navigation system, and to generate the one or more control signals based at least in part on the determined velocity and altitude.

F5. The controller of paragraph F4, wherein the control component is further configured to determine an orientation of the image sensing system relative to a nadir, determine a surface resolution cell size on the surface of the earth based at least in part on the determined altitude and image sensing system orientation, and determine the time it takes for the image sensing system to move the along-track dimension relative to the surface based at least in part on the determined velocity and surface resolution cell size.

F6. The controller of paragraph F0, wherein the image sensing system has p rows of n sensor elements that produce the pixel frames, where p is a positive integer less than or equal to M, and n is a positive integer less than or equal to a number of image data pixels in each of the M rows, and wherein the output component is further configured to output to the transmitter for transmission to the receiver, base image data from a pixel frame only for surface resolution cells for which base image data has not previously been transmitted.

G0. A method comprising generating one or more control signals configured to control a velocity of an image sensing system based on a rate of recording pixel frames in the image sensing system.

G1. The method of paragraph G0, further comprising generating one or more control signals configured to control the rate of recording pixel frames in an image sensing system based on the velocity of the image sensing system.

G2. The method of paragraph G0, further comprising generating one or more control signals configured to control a distance of the image sensing system from a surface being imaged by the image sensing system.

G3. The method of paragraph G0, where the image sensing system is moving in a direction of travel relative to a surface being imaged that is spaced from the image sensing system, the image sensing system including one or more sensor elements for recording a pixel frame including at least M adjacent rows each having at least one image data pixel, with each image data pixel corresponding to a surface resolution cell of the surface determined by an instantaneous field of view of the surface by the associated sensor element, with the M rows disposed along the direction of travel, where M is an integer greater than one, and each surface resolution cell has an along-track dimension in the direction of travel, and wherein generating one or more control signals configured to control the velocity includes generating one or more control signals to control the velocity such that each recording interval of time associated with recording of the pixel frames is within a threshold amount of time equal to m multiplied by a time it takes for the image sensing system to move the along-track dimension relative to the surface, where m is an integer less than M.

G4. The method of paragraph G3, further comprising outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m.

G5. The method of paragraph G4, wherein outputting as base image data the recorded image data pixel for each cell includes outputting as base image data the recorded image data pixel for the surface resolution cell only one time.

G6. The method of paragraph G5, wherein for each surface resolution cell, outputting as base image data, a recorded image data pixel includes outputting to the transmitter for transmission as base image data to the receiver, the recorded image data pixels corresponding to the first m rows of recorded image data pixels in the direction of travel.

G7. The method of paragraph G1, where the image sensing system is moving in a direction of travel relative to a surface being imaged that is spaced from the image sensing system, the image sensing system including one or more sensor elements for recording a pixel frame including at least M adjacent rows each having at least one image data pixel, with each image data pixel corresponding to a surface resolution cell of the surface determined by an instantaneous field of view of the surface by the associated sensor element, with the M rows disposed along the direction of travel, where M is an integer greater than one, and each surface resolution cell has an along-track dimension in the direction of travel, wherein generating one or more control signals associated with one or more of controlling the velocity and controlling the rate of recording pixel frames, which one or more control signals are configured such that each recording interval of time associated with recording of the pixel frames is within a threshold amount of time equal to m multiplied by a time it takes for the image sensing system to move the along-track dimension relative to the surface, where m is an integer less than M, the method further comprising: outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m; and comparing, for each surface resolution cell for which base image data has been output, a recently recorded image data pixel with a previously recorded image data pixel, and outputting the recently recorded image data pixel to the transmitter for transmission to the receiver as change image data when the recently recorded image data pixel is different than the previously recorded image data pixel by at least a threshold amount.

G8. The method of paragraph G0, wherein the image sensing system is moving in a direction of travel relative to a surface of the earth being imaged that is spaced from the image sensing system, the image sensing system including one or more sensor elements for recording a pixel frame including at least M adjacent rows each having at least one image data pixel, with each image data pixel corresponding to a surface resolution cell of the surface determined by an instantaneous field of view of the surface by the associated sensor element, with the M rows disposed along the direction of travel, where M is an integer greater than one, and each surface resolution cell has an along-track dimension in the direction of travel, the method further comprising, prior to generating the one or more control signals, determining the velocity and an altitude of the image sensing system relative to the surface of the earth using a satellite navigation system.

G9. The method of paragraph G8, further comprising determining an orientation of the image sensing system relative to a nadir, determining a surface resolution cell size on the surface of the earth based at least in part on the determined altitude and image sensing system orientation, and determining the time it takes for the image sensing system to move the along-track dimension relative to the surface based at least in part on the determined velocity and surface resolution cell size.

G10. The method of paragraph G9, where each of the pixel frames are produced by p rows of n sensor elements of the image sensing system, where p is a positive integer less than or equal to M, and n is a positive integer less than or equal to a number of image data pixels in each of the M rows, wherein generating one or more control signals includes generating one or more control signals such that each recording interval of time associated with recording of the pixel frames is within a threshold amount of time equal to m multiplied by a time it takes for the image sensing system to move the along-track dimension relative to the surface, where m is an integer less than M, the method further comprising outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m, wherein outputting base image data includes outputting for each recorded pixel frame, only base image data for surface resolution cells not previously output to the transmitter for transmission to the receiver.

G11. The method of paragraph G10, further comprising comparing, for each surface resolution cell for which base image data has been output to the transmitter for transmission to the receiver, a recently recorded image data pixel with a previously output base or change image data, and outputting to the transmitter for transmission to the receiver as change image data the recently recorded image data pixel only if the recently recorded image data pixel is different than the previously recorded image data pixel by at least a threshold amount.

G12. The method of paragraph G1, where the image sensing system is moving in a direction of travel relative to a surface being imaged that is spaced from the image sensing system, the image sensing system including p rows of n sensor elements for producing a pixel frame including at least M adjacent rows each having at least one image data pixel, with each image data pixel corresponding to a surface resolution cell of the surface determined by an instantaneous field of view of the surface by the associated sensor element, with the M rows disposed along the direction of travel, where M is an integer greater than one, and each surface resolution cell has an along-track dimension in the direction of travel, where p is a positive integer less than or equal to M, and n is a positive integer less than or equal to a number of image data pixels in each of the M rows, wherein generating one or more control signals associated with one or more of controlling the velocity and controlling the rate of recording pixel frames is configured such that each recording interval of time associated with recording of the pixel frames is within a threshold amount of time equal to m multiplied by a time it takes for the image sensing system to move the along-track dimension relative to the surface, where m is an integer less than M, the method further comprising outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m, wherein outputting base image data includes outputting only base image data from a pixel frame for surface resolution cells for which base image data has not previously been output to the transmitter for transmission to the receiver.

H0. A method comprising generating one or more control signals configured to control a rate of recording pixel frames in an image sensing system based on a velocity of the image sensing system.

H1. The method of paragraph H0, where the image sensing system is moving in a direction of travel relative to a surface being imaged that is spaced from the image sensing system, the image sensing system including one or more sensor elements for recording a pixel frame including at least M adjacent rows each having at least one image data pixel, with each image data pixel corresponding to a surface resolution cell of the surface determined by an instantaneous field of view of the surface by the associated sensor element, with the M rows disposed along the direction of travel, where M is an integer greater than one, and each surface resolution cell has an along-track dimension in the direction of travel, and wherein generating one or more control signals is configured such that each recording interval of time associated with recording of the pixel frames is within a threshold amount of time equal to m multiplied by a time it takes for the image sensing system to move the along-track dimension relative to the surface, where m is an integer less than M, the method further comprising outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m.

I0. A method comprising: storing a plurality of pixel frames taken from one or more sets of pixel frames received from an image sensing system moving in a direction of travel relative to a surface being imaged, wherein the surface is spaced from the image sensing system, the image sensing system having one or more sensor elements for producing the one or more sets of pixel frames, where each pixel frame includes at least M adjacent rows each having at least one image data pixel, each image data pixel corresponding to a surface resolution cell of the surface determined by an instantaneous field of view of the surface by the associated sensor element, the M rows being disposed along the direction of travel, M being an integer greater than one, and each surface resolution cell having an along-track dimension in the direction of travel, where each set of pixel frames includes pixel frames recorded at each of a plurality of sequential recording intervals of time, with each recording interval of time being within a threshold amount of time equal to m multiplied by a time it takes for the image sensing system to move the along-track dimension relative to the surface, where m is an integer less than M.

I1. The method of paragraph I0, further comprising outputting to a transmitter for transmission to a receiver that is remote from the image sensing system, a recently recorded image data pixel for those surface resolution cells for which there is no currently stored reference image data pixel of a previously recorded pixel frame that is the same or is different by less than a threshold amount as the recently recorded image data pixel.

I2. The method of paragraph I0, further comprising generating one or more control signals configured to control one or more of (a) a velocity of the image sensing system relative to the surface, (b) a distance of the image sensing system from the surface, and (c) a rate of recording the pixel frames so that each recording interval of time is within the threshold amount of time.

I3. The method of paragraph I2, where the surface is the surface of the earth, the method further comprising, prior to generating one or more control signals, determining the velocity and altitude of the image sensing system relative to the surface of the earth using a satellite navigation system.

I4. The method of paragraph I3, further comprising determining an orientation of the image sensing system relative to a nadir, determining a surface resolution cell size on the surface of the earth based at least in part on the determined altitude and image sensing system orientation, and determining the time it takes for the image sensing system to move the along-track dimension relative to the surface based at least in part on the determined velocity and surface resolution cell size.

J0. A controller comprising a control component configured to be operatively coupled to an image sensing system, the image sensing system being supported by a platform disposed in spaced relationship from and moving in a direction of travel relative to a surface, the image sensing system having one or more sensor elements for producing one or more sets of pixel frames, where each pixel frame includes at least M adjacent rows each having at least one image data pixel, each image data pixel corresponding to a surface resolution cell of the surface determined by an instantaneous field of view of the surface by the associated sensor element, the M rows being disposed along the direction of travel, M being an integer greater than one, and each surface resolution cell having an along-track dimension in the direction of travel, the control component being configured to generate one or more control signals for controlling one or more of (a) a velocity of the image sensing system relative to the surface, (b) a distance of the image sensing system from the surface, and (c) a rate of recording the pixel frames, such that each recording interval of time associated with recording of the pixel frames is within a threshold amount of time equal to m multiplied by a time it takes for the image sensing system to move the along-track dimension relative to the surface, where m is an integer less than M.

J1. The controller of paragraph J0, further comprising an output component coupled to the control component and configured to output to a transmitter for transmission as base image data from the controller to a receiver that is remote from the controller, an image data pixel for each surface resolution cell from at least one pixel frame and less than a number of pixel frames that is equal to the highest integer less than M/m.

J2. The controller of paragraph J1, wherein the output component is further configured to output to the transmitter for transmission as base image data from the controller to the receiver, the image data pixel for each surface resolution cell only one time.

J3. The controller of paragraph J1, wherein the output component is further configured, for each recorded pixel frame, to output to the transmitter for transmission as base image data the image data pixels of each pixel frame corresponding to the first m rows of image data pixels in the direction of travel.

J4. The controller of paragraph J1, wherein the output component is further configured to compare a recently recorded image data pixel with a previously recorded image data pixel for each surface resolution cell for which base image data has been transmitted, and to output to the transmitter for transmission as change image data to the receiver, the recently recorded image data pixel when the recently recorded image data pixel is different than the previously recorded image data pixel by at least a threshold amount.

J5. The controller of paragraph J0, where the surface is the surface of the earth, wherein the control component is further configured to determine the velocity and altitude of the image sensing system relative to the surface of the earth using a satellite navigation system, and to generate the one or more control signals based at least in part on the determined velocity and altitude.

J6. The controller of paragraph J5, wherein the control component is further configured to determine an orientation of the image sensing system relative to a nadir, determine a surface resolution cell size on the surface of the earth based at least in part on the determined altitude and image sensing system orientation, and determine the time it takes for the image sensing system to move the along-track dimension relative to the surface based at least in part on the determined velocity and surface resolution cell size.

J7. The controller of paragraph J1, where the image sensing system has p rows of n sensor elements that produce the pixel frames, where p is a positive integer less than or equal to M, and n is a positive integer less than or equal to a number of image data pixels in each of the M rows, and wherein the output component is further configured to output to the transmitter for transmission to the receiver, base image data from a pixel frame only for surface resolution cells for which base image data has not previously been transmitted.

Advantages, Features, Benefits

The different embodiments of the systems and methods described herein provide several advantages over known solutions for compressing recorded image data. For example, the illustrative embodiments described herein allow for much greater compression by not including redundant recorded image data or as much redundant recording data. Additionally, and among other benefits, illustrative embodiments described herein allow for location and timing information of an image sensing system to be used to determine base and change image data corresponding to previously captured base image data. Thus, the illustrative embodiments described herein are particularly useful for compression and transmission of flyover ISR video, in which global motion of the image sensing system can be determined and controlled to correspond with previously captured images; and/or aspects of the image sensor such as scan rate, line rate, frame rate, and pixel size can be controlled to correspond to the global motion of the camera.

However, not all embodiments described herein provide the same advantages or the same degree of advantage.

CONCLUSION

The disclosure set forth above may encompass multiple distinct embodiments with independent utility. Although each of these embodiments has been disclosed in its preferred form(s), the specific embodiments thereof as disclosed and illustrated herein are not to be considered in a limiting sense, because numerous variations are possible. The subject matter of the embodiments includes all novel and nonobvious combinations and subcombinations of the various elements, features, functions, and/or properties disclosed herein. The following claims particularly point out certain combinations and subcombinations regarded as novel and nonobvious. Embodiments of other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the embodiments of the present disclosure.

What is claimed is:

1. A method comprising:
    generating one or more control signals configured to control an along-track velocity of an image sensing system moving in a direction of travel along a surface being imaged based on a rate of recording pixel frames in the image sensing system;
    the image sensing system including one or more sensor elements for recording a pixel frame including at least M adjacent rows each having at least one image data pixel, with each image data pixel corresponding to a surface resolution cell of the surface determined by an instantaneous field of view of the surface by the associated sensor element, with the M rows disposed along the direction of travel, where M is an integer greater than one, and each surface resolution cell has an along-track dimension in the direction of travel, and wherein generating one or more control signals configured to control the along-track velocity includes generating the one or more control signals configured to control the along-track velocity such that each recording interval of time associated with recording of the pixel frames is within a threshold amount of time equal to m multiplied by a time it takes for the image sensing system to move the along-track dimension relative to the surface, where m is a positive integer less than M; and
    outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m.

2. The method of claim 1, further comprising generating one or more control signals configured to control the rate of recording pixel frames in the image sensing system based on the velocity of the image sensing system.

3. The method of claim 2 further comprising:
    comparing, for each surface resolution cell for which base image data has been output, a recently recorded image data pixel with a previously recorded image data pixel, and outputting the recently recorded image data pixel to the transmitter for transmission to the receiver as change image data when the recently recorded image data pixel is different than the previously recorded image data pixel by at least a threshold amount.

4. The method of claim 2, wherein generating the one or more control signals configured to control the along-track velocity includes generating one or more control signals associated with one or more of controlling the along-track velocity and controlling the rate of recording pixel frames.

5. The method of claim 1, further comprising generating one or more control signals configured to control a distance of the image sensing system from a surface being imaged by the image sensing system.

6. The method of claim 1, wherein outputting as base image data the recorded image data pixel for each cell includes outputting as base image data the recorded image data pixel for the surface resolution cell only one time.

7. The method of claim 6, wherein for each surface resolution cell, outputting as base image data, a recorded image data pixel includes outputting to the transmitter for transmission as base image data to the receiver, the recorded image data pixels corresponding to the first m rows of recorded image data pixels in the direction of travel.

8. The method of claim 1 further comprising, prior to generating the one or more control signals, determining the along-track velocity and an altitude of the image sensing system relative to the surface of the earth using a satellite navigation system.

9. The method of claim 8, further comprising determining an orientation of the image sensing system relative to a nadir, determining a surface resolution cell size on the surface of the earth based at least in part on the determined altitude and image sensing system orientation, and determining the time it takes for the image sensing system to move the along-track dimension relative to the surface based at least in part on the determined along-track velocity and surface resolution cell size.

10. The method of claim 9, further comprising comparing, for each surface resolution cell for which base image data has been output to the transmitter for transmission to the receiver, a recently recorded image data pixel with a previously output base or change image data, and outputting to the transmitter for transmission to the receiver as change image data the recently recorded image data pixel only if the recently recorded image data pixel is different than the previously recorded image data pixel by at least a threshold amount.

11. A method comprising generating one or more control signals configured to control a rate of recording pixel frames in an image sensing system based on an along-track velocity of the image sensing system moving in a direction of travel relative to a surface being imaged that is spaced from the image sensing system, the image sensing system including one or more sensor elements for recording a pixel frame including at least M adjacent rows each having at least one image data pixel, with each image data pixel corresponding to a surface resolution cell of the surface determined by an instantaneous field of view of the surface by the associated sensor element, with the M rows disposed along the direction of travel, where M is an integer greater than one, and each surface resolution cell has an along-track dimension in the direction of travel, and wherein generating one or more control signals is configured such that each recording interval of time associated with recording of the pixel frames is within a threshold amount of time equal to m multiplied by a time it takes for the image sensing system to move the along-track dimension relative to the surface, where m is a positive integer less than M, the method further comprising outputting to a transmitter for transmission as base image data to a receiver that is remote from the image sensing system, a recorded image data pixel for each surface resolution cell from at least one recorded pixel frame and less than a number of recorded pixel frames that is equal to the highest integer less than M/m.

12. A controller comprising:
a control component configured to be operatively coupled to an image sensing system, the image sensing system being supported by a platform disposed in spaced relationship from and moving in a direction of travel relative to a surface, the image sensing system having one or more sensor elements for producing one or more sets of pixel frames, where each pixel frame includes at least M adjacent rows each having at least one image data pixel, each image data pixel corresponding to a surface resolution cell of the surface determined by an instantaneous field of view of the surface by the associated sensor element, the M rows being disposed along the direction of travel, M being an integer greater than one, and each surface resolution cell having an along-track dimension in the direction of travel, the control component being configured to generate one or more control signals for controlling one or more of (a) an along-track velocity of the image sensing system moving in the travel direction relative to the surface, (b) a distance of the image sensing system from the surface, and (c) a rate of recording the pixel frames, such that each recording interval of time associated with recording of the pixel frames is within a threshold amount of time equal to m multiplied by a time it takes for the image sensing system to move the along-track dimension relative to the surface, where m is a positive integer less than M; and
an output component coupled to the control component and configured to output to a transmitter for transmission as base image data from the controller to a receiver that is remote from the controller, an image data pixel for each surface resolution cell from at least one pixel frame and less than a number of pixel frames that is equal to the highest integer less than M/m.

13. The controller of claim 12, wherein the output component is further configured to output to the transmitter for transmission as base image data from the controller to the receiver, the image data pixel for each surface resolution cell only one time.

14. The controller of claim 12, wherein the output component is further configured, for each recorded pixel frame, to output to the transmitter for transmission as base image data the image data pixels of each pixel frame corresponding to the first m rows of image data pixels in the direction of travel.

15. The controller of claim 12, wherein the output component is further configured to compare a recently recorded image data pixel with a previously recorded image data pixel for each surface resolution cell for which base image data has been transmitted, and to output to the transmitter for transmission as change image data to the receiver, the recently recorded image data pixel when the recently recorded image data pixel is different than the previously recorded image data pixel by at least a threshold amount.

16. The controller of claim 12, where the surface is the surface of the earth, wherein the control component is further configured to determine the velocity and altitude of the image sensing system relative to the surface of the earth using a satellite navigation system, and to generate the one or more control signals based at least in part on the determined velocity and altitude.

17. The controller of claim 16, wherein the control component is further configured to determine an orientation of the image sensing system relative to a nadir, determine a surface resolution cell size on the surface of the earth based at least in part on the determined altitude and image sensing system orientation, and determine the time it takes for the image sensing system to move the along-track dimension relative to the surface based at least in part on the determined velocity and surface resolution cell size.

18. The controller of claim 12, where the image sensing system has p rows of n sensor elements that produce the pixel frames, where p is a positive integer less than or equal to M, and n is a positive integer less than or equal to a number of image data pixels in each of the M rows, and wherein the output component is further configured to output to the transmitter for transmission to the receiver, base image data from a pixel frame only for surface resolution cells for which base image data has not previously been transmitted.

* * * * *